US012626379B1

(12) United States Patent
Kovacs et al.

(10) Patent No.: US 12,626,379 B1
(45) Date of Patent: May 12, 2026

(54) MODELING AN ENVIRONMENT BASED ON LIMITED DATA

(71) Applicant: Apple Inc., Cupertino, CA (US)

(72) Inventors: Daniel L. Kovacs, Santa Clara, CA (US); Mark E. Drummond, Palo Alto, CA (US); Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 222 days.

(21) Appl. No.: 17/826,613

(22) Filed: May 27, 2022

Related U.S. Application Data

(60) Provisional application No. 63/211,646, filed on Jun. 17, 2021.

(51) Int. Cl.
  *G06T 7/60* (2017.01)
  *G06T 7/50* (2017.01)
  *G06T 17/10* (2006.01)

(52) U.S. Cl.
  CPC ................. *G06T 7/50* (2017.01); *G06T 7/60* (2013.01); *G06T 17/10* (2013.01); *G06T 2207/10028* (2013.01); *G06T 2207/20084* (2013.01)

(58) Field of Classification Search
  CPC .. G06T 7/50; G06T 7/60; G06T 17/10; G06T 2207/10028; G06T 2207/20084
  See application file for complete search history.

(56) References Cited

U.S. PATENT DOCUMENTS

| | | | |
|---|---|---|---|
| 9,336,436 B1* | 5/2016 | Dowdall | B60W 60/0027 |
| 2014/0354528 A1* | 12/2014 | Laughlin | G06F 3/011 |
| | | | 345/156 |
| 2017/0004649 A1* | 1/2017 | Collet Romea | G06T 7/33 |
| 2017/0053438 A1* | 2/2017 | Huang | G06T 17/20 |
| 2017/0287216 A1* | 10/2017 | Kim | H04L 67/1097 |
| 2019/0311501 A1* | 10/2019 | Mammou | G06T 9/001 |
| 2019/0311546 A1* | 10/2019 | Tay | G06T 7/521 |
| 2019/0324147 A1* | 10/2019 | Day | G06F 18/24 |
| 2020/0098122 A1* | 3/2020 | Dal Mutto | G06T 17/00 |
| 2020/0258247 A1* | 8/2020 | Lasserre | G06T 15/205 |
| 2021/0065431 A1* | 3/2021 | Bergmann | G06T 5/70 |
| 2021/0178583 A1* | 6/2021 | Ye | B25J 13/08 |
| 2021/0201575 A1* | 7/2021 | Arora | G06T 7/564 |
| 2021/0304518 A1* | 9/2021 | Gao | G01C 21/3811 |
| 2021/0373173 A1* | 12/2021 | Ozaslan | G01S 17/931 |

(Continued)

*Primary Examiner* — Phi Hoang
(74) *Attorney, Agent, or Firm* — Fernando & Partners, LLP

(57) ABSTRACT

In some implementations, a method includes obtaining environmental data corresponding to an environment. The method includes determining that the environmental data corresponding to the environment includes environmental data that corresponds to a first portion of an object that represents a sub-portion of the object and not an entirety of the object. The method includes generating a plurality of candidate point clouds for a second portion of the object based on the environmental data corresponding to the first portion of the object. The plurality of candidate point clouds are associated with corresponding confidence scores. The method includes synthesizing a model of the environment that includes a point cloud representing the first portion of the object, at least a subset of the plurality of candidate point clouds for the second portion of the object and the corresponding confidence scores associated with the subset of the plurality of candidate point clouds.

20 Claims, 12 Drawing Sheets

(56) References Cited

U.S. PATENT DOCUMENTS

| | | | | |
|---|---|---|---|---|
| 2021/0374552 A1* | 12/2021 | Mallya | .................. | G06N 3/088 |
| 2021/0385303 A1* | 12/2021 | Ray | ...................... | H04L 69/04 |
| 2021/0405638 A1* | 12/2021 | Boyraz | ................ | G06V 20/64 |
| 2022/0032454 A1* | 2/2022 | Yang | ..................... | B25J 9/1612 |
| 2022/0044430 A1* | 2/2022 | Eckman | ................ | G06V 20/64 |
| 2022/0335688 A1* | 10/2022 | Eckman | ................ | G06T 17/05 |

* cited by examiner

300

700

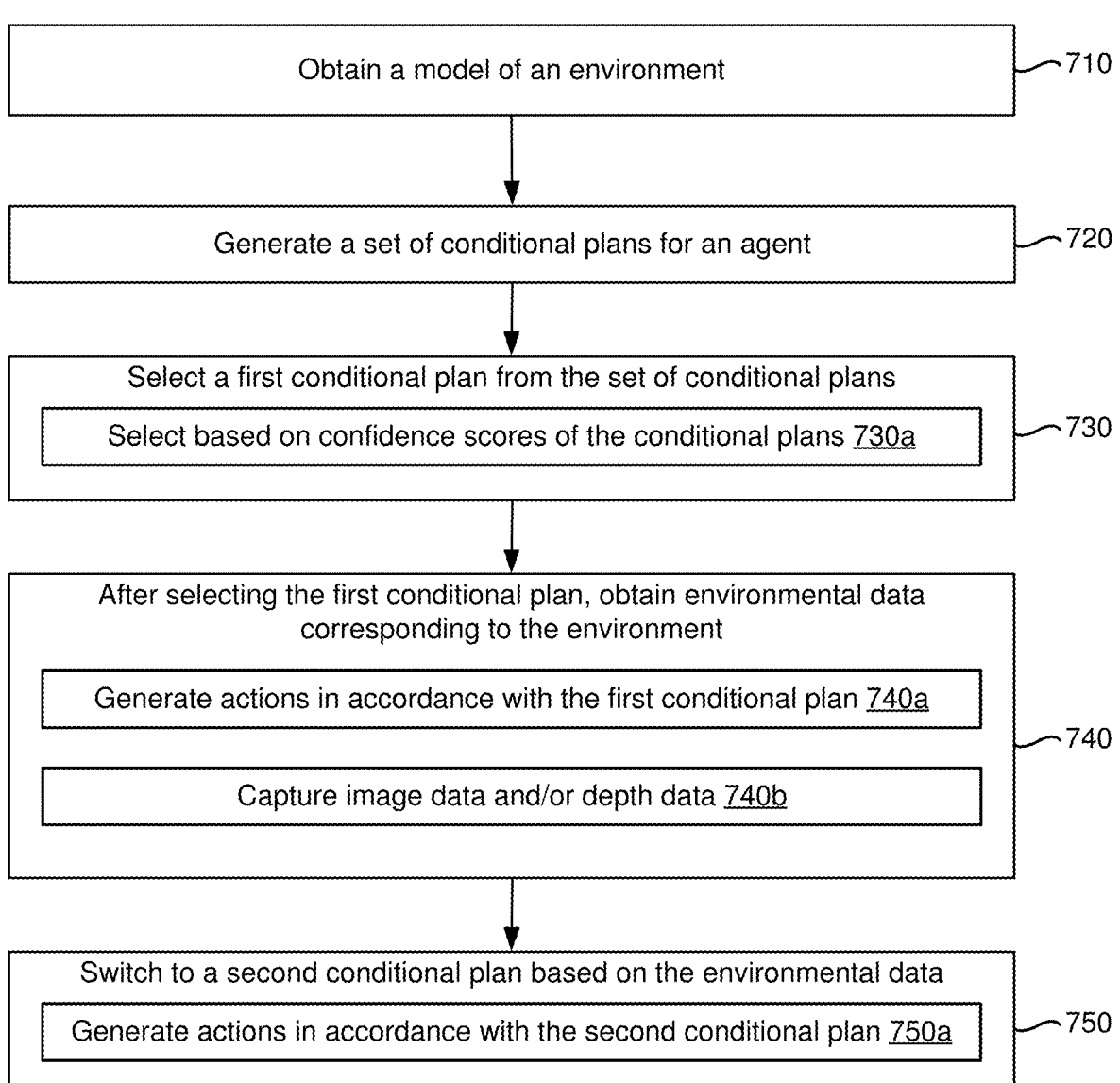

Obtain a model of an environment ⟋710

Generate a set of conditional plans for an agent ⟋720

Select a first conditional plan from the set of conditional plans

Select based on confidence scores of the conditional plans 730a ⟋730

After selecting the first conditional plan, obtain environmental data corresponding to the environment Generate actions in accordance with the first conditional plan 740a Capture image data and/or depth data 740b ⟋740

Switch to a second conditional plan based on the environmental data

Generate actions in accordance with the second conditional plan 750a ⟋750

Figure 7

MODELING AN ENVIRONMENT BASED ON LIMITED DATA

CROSS-REFERENCE TO RELATED APPLICATION

This application claims the benefit of U.S. Provisional Patent App. No. 63/211,646, filed on Jun. 17, 2021, which is incorporated by reference in its entirety.

TECHNICAL FIELD

The present disclosure generally relates to modeling an environment based on limited data.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of generating a set of conditional plans in accordance with some implementations.

Figure 1A:
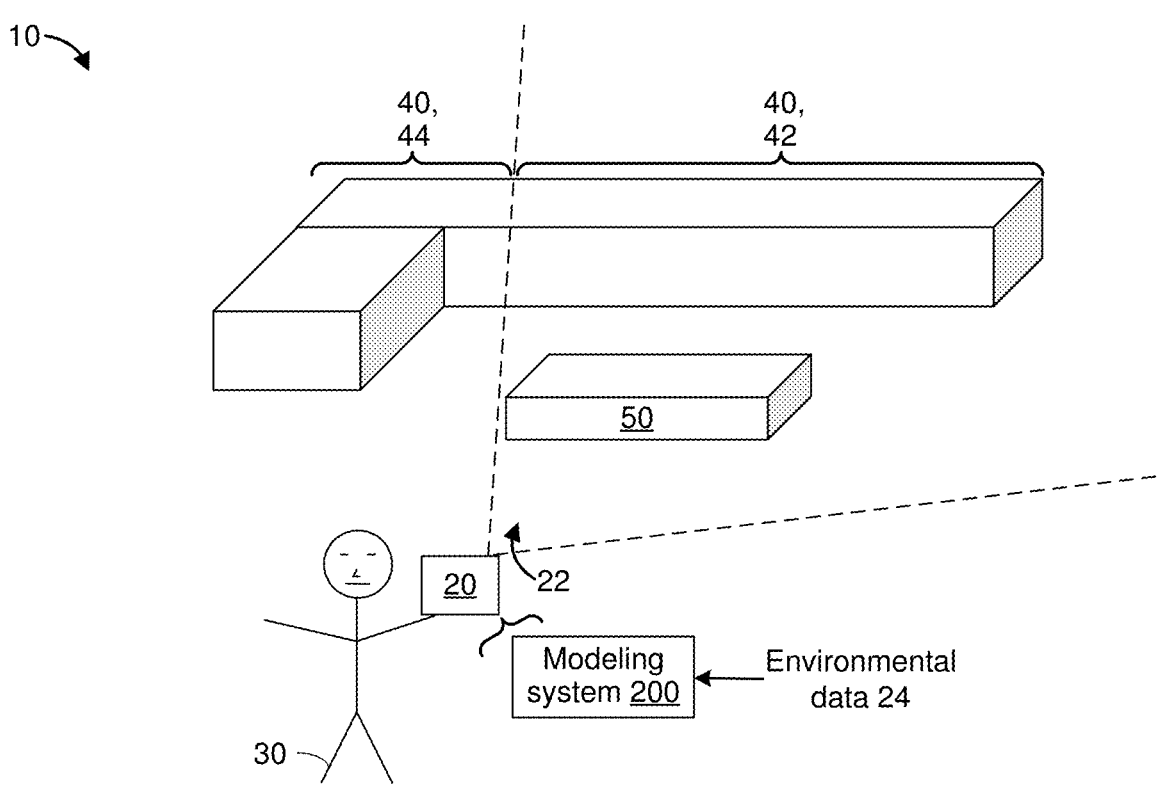
FIG. 1A is a diagram of an example environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing a model of an environment based on limited environmental data corresponding to the environment. In some implementations, a device includes an environmental sensor, a non-transitory memory and one or more processors coupled with the environmental sensor and the non-transitory memory. In some implementations, a method includes obtaining, via the environmental sensor, environmental data corresponding to an environment. In some implementations, the method includes determining that the environmental data corresponding to the environment includes environmental data that corresponds to a first portion of an object that represents a sub-portion of the object and not an entirety of the object. In some implementations, the method includes generating a plurality of candidate point clouds for a second portion of the object based on the environmental data corresponding to the first portion of the object. In some implementations, the plurality of candidate point clouds are associated with corresponding confidence scores. In some implementations, the method includes synthesizing a model of the environment that includes a point cloud representing the first portion of the object, at least a subset of the plurality of candidate point clouds for the second portion of the object and the corresponding confidence scores associated with the subset of the plurality of candidate point clouds.

Various implementations disclosed herein include devices, systems, and methods for generating a set of conditional plans for an agent based on a model that includes a plurality of candidate point clouds. In some implementations, a device includes a non-transitory memory and one or more processors coupled with the non-transitory memory. In some implementations, a method includes obtaining a model of an environment that includes a point cloud representing a first portion of an object, a plurality of candidate point clouds for a second portion of the object and corresponding confidence scores associated with the plurality of candidate point clouds. In some implementations, the method includes generating a set of conditional plans for an agent that is associated with an objective. In some implementations, each conditional plan in the set of conditional plans corresponds to a respective candidate point cloud of the plurality of point clouds in the model. In some implementations, the method includes selecting a first conditional plan from the set of conditional plans based on the corresponding confidence scores associated with the plurality of candidate point clouds. In some implementations, the first conditional plan corresponds to a first candidate point cloud of the plurality of candidate point clouds. In some implementations, the method includes, after selecting the first conditional plan, obtaining environmental data corresponding to the environment. In some implementations, the method includes switching to a second conditional plan of the set of conditional plans in response to the environmental data indicating that the second portion of the object matches a second candidate point cloud of the plurality of candidate point clouds.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Generating a model of an environment often requires environmental data that corresponds to the environment. For example, generating the model often requires image data captured by an image sensor and/or depth data captured by a depth sensor. However, in some scenarios, the environmental data may be limited. As such, the device may be unable to generate a model that accurately represents the environment. For example, some objects in the environment may be occluded and the captured environmental data may not include environmental data that corresponds to the occluded portions of the objects. As another example, portions of some objects may be outside a field-of-detection of an environmental sensor. For example, a portion of a table may be outside a field-of-view of a camera that is capturing images of the environment.

The present disclosure provides methods, systems, and/or devices for synthesizing a model for an environment based on limited environmental data. A device obtains environmental data that corresponds to an environment. For example, the device receives image data captured by an image sensor and/or depth data captured by a depth sensor. The device determines that the environmental data includes environmental data that corresponds to a first portion of an object and not environmental data that corresponds to a second portion of the object. For example, the device determines that the device has an image of a portion of a table and not the entire table. The device generates candidate point clouds for the second portion of the object based on the environmental data that corresponds to the first portion of the object. For example, the device generates candidate shapes for a non-visible portion of the table based on an image of a visible portion of the table. The device assigns confidence scores to each candidate point cloud. The confidence scores indicate a likelihood of the candidate point clouds being representative of the non-visible portion of the object. The device synthesizes a model for the environment that includes the candidate point clouds and their corresponding confidence scores.

The device can generate the candidate point clouds by extrapolating a geometric feature indicated by environmental data corresponding to the visible portion of the object. For example, the device can extrapolate a visible portion of a line. Additionally or alternatively, the device can generate the candidate point clouds by estimating a dimension of the object based on dimensions of the visible portion of the object. Additionally or alternatively, the device can generate the candidate point clouds based on a known dimension of the environment.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a modeling system 200. In some implementations, the electronic device 20 includes a handheld computing device that can be held by a user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) or an electronic watch. In various implementations, the physical environment 10 includes various physical articles. In the example of FIG. 1A, the physical environment 10 includes a couch 40 and a coffee table 50.

In the example of FIG. 1A, the modeling system 200 resides at the electronic device 20. For example, the electronic device 20 implements the modeling system 200. In some implementations, the electronic device 20 includes a set of computer-readable instructions corresponding to the modeling system 200. Although the modeling system 200 is shown as being integrated into the electronic device 20, in some implementations, the modeling system 200 is separate from the electronic device 20. For example, in some implementations, the modeling system 200 resides at another device (e.g., at a controller, a server or a cloud computing platform).

In various implementations, the electronic device 20 includes an environmental sensor (not shown) with a field of detection 22. In some implementations, the environmental sensor includes an image sensor (e.g., a camera, for example, a visible light camera and/or an infrared (IR) camera) and the field of detection 22 is a field of view of the image sensor. In some implementations, the environmental sensor includes a depth sensor (e.g., a depth camera) and the field of detection 22 is a field of view of the depth sensor.

In various implementations, the environmental sensor captures environmental data 24 that corresponds to objects that are in the field of detection 22 of the environmental sensor. As shown in FIG. 1A, a first portion 42 of the couch 40 and the coffee table 50 are in the field of detection 22 of the environmental sensor. As such, in the example of FIG. 1A, the environmental data 24 includes environmental data that corresponds to the first portion 42 of the couch 40 and the coffee table 50. As further shown in FIG. 1A, a second portion 44 of the couch 40 is not in the field of detection 22 of the environmental sensor. As such, in the example of FIG. 1A, the environmental data 24 does not include environmental data that corresponds to the second portion 44 of the couch 40.

In some implementations, the environmental data 24 includes image data that includes a set of one or more images that depict the first portion 42 of the couch 40 and the coffee table 50, and not the second portion 44 of the couch 40. For example, in some implementations, the environmental data 24 includes a set of one or more images with pixels that correspond to the first portion 42 of the couch 40 and the coffee table 50, and not the second portion 44 of the couch 40. In some implementations, the environmental data 24 includes depth data that corresponds to the first portion 42 of the couch 40 and the coffee table 50, and not the second portion 44 of the couch 40.

In various implementations, the modeling system 200 generates a model of the physical environment 10 based on the environmental data 24. As described herein, in some implementations, the modeling system 200 models portions of the physical environment 10 that are represented by the environmental data 24, and a portion of the physical environment 10 that is not represented by the environmental data 24. Since the environmental data 24 is limited by the field of detection 22 of the environmental sensor, by modeling portions of the physical environment 10 that are outside the field of detection 22 the modeling system 200 models the physical environment 10 based on limited environmental data.

Figure 1B:
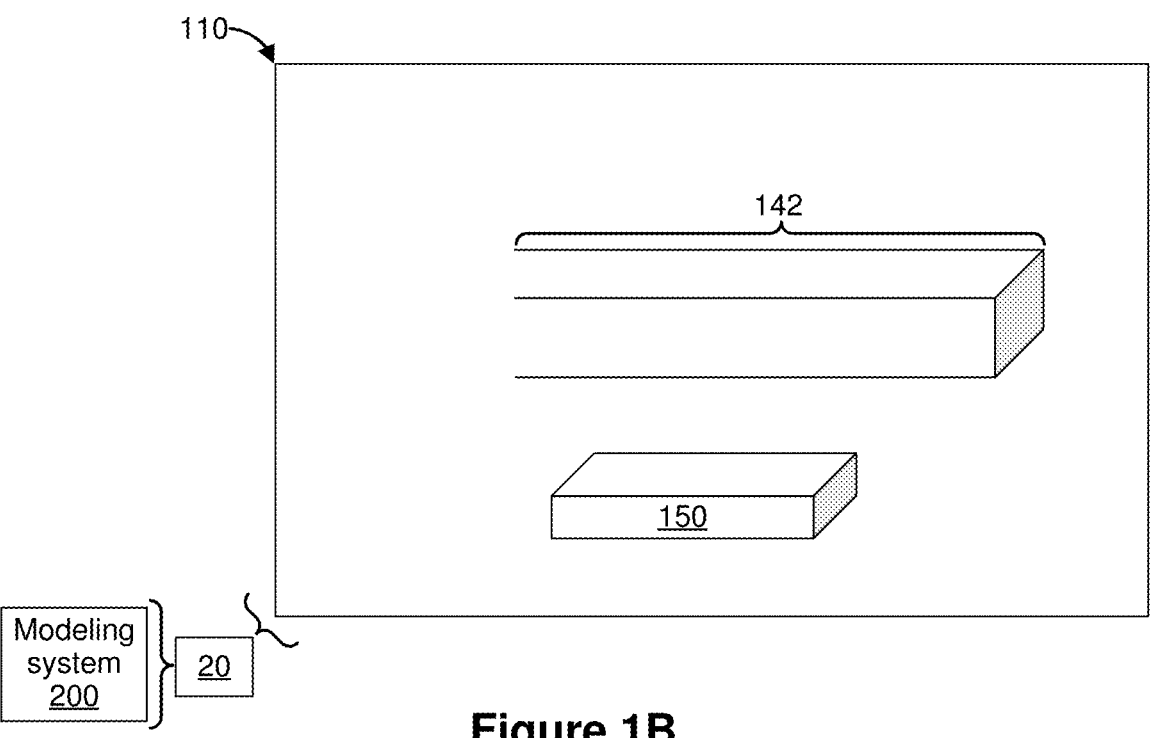
FIGS. 1B-1F are diagrams of example models of the environment in accordance with some implementations.

FIG. 1B illustrates a graphical environment 110 that corresponds to a portion of the physical environment 10 that is represented by the environmental data 24 shown in FIG. 1A. In some implementations, the graphical environment 110 represents a model of the portion of the physical environment 10 that is represented by the environmental data 24. In the example of FIG. 1B, the graphical environment 110 includes a first virtual couch portion 142 of a virtual couch that models the first portion 42 of the couch 40, and a virtual coffee table 150 that models the coffee table 50. Since the environmental data 24 does not include environmental data that corresponds to the second portion 44 of the couch 40, the graphical environment 110 does not include a model of the second portion 44 of the couch 40. As described herein, in various implementations, the modeling system 200 determines candidate shapes that model the second portion 44 of the couch 40 in order to model a portion of the physical environment 10 that is not represented by the environmental data 24.

Figure 1C:
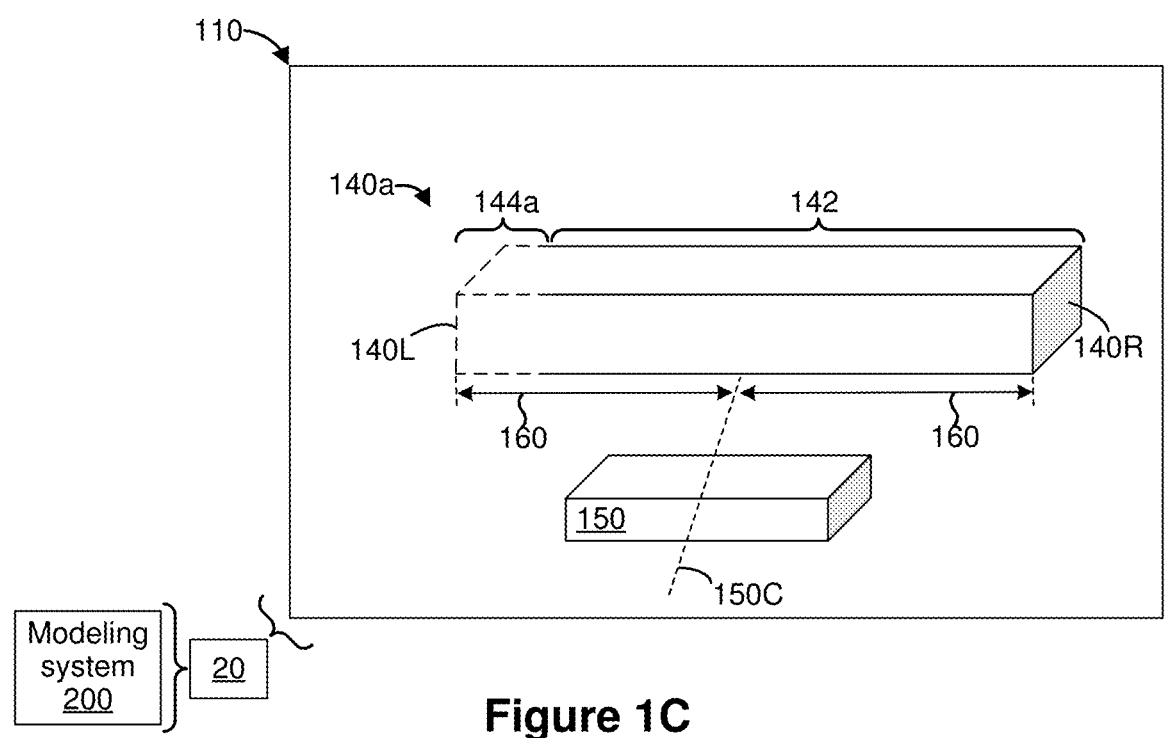

FIG. 1C illustrates a first candidate shape 144a that the modeling system 200 generates in order to model a portion of the couch 40 that is not represented by the environmental data 24 shown in FIG. 1A. In the example of FIG. 1C, the modeling system 200 generates the first candidate shape 144a based on a determination (e.g., an assumption) that a center axis of the coffee table 50 is equidistant from a right face of the couch 40 and a left face of the couch 40. As such, the modeling system 200 generates the first candidate shape 144a such that a center axis 150C of the virtual coffee table 150 is equidistant from a right face 140R of a first candidate virtual couch 140a and a left face 140L of the first candidate virtual couch 140a. For example, as shown in FIG. 1C, the center axis 150C of the virtual coffee table 150 is a distance 160 from the right face 140R of the first candidate virtual couch 140a and the left face 140L of the first candidate virtual couch 140a. In some implementations, the modeling system 200 generates the first candidate shape 144a by extrapolating (e.g., extending) lines of the first virtual couch portion 142 such that the right face 140R and the left face 140L of the first candidate virtual couch 140a are equidistant from the center axis 150C.

Figure 1D:
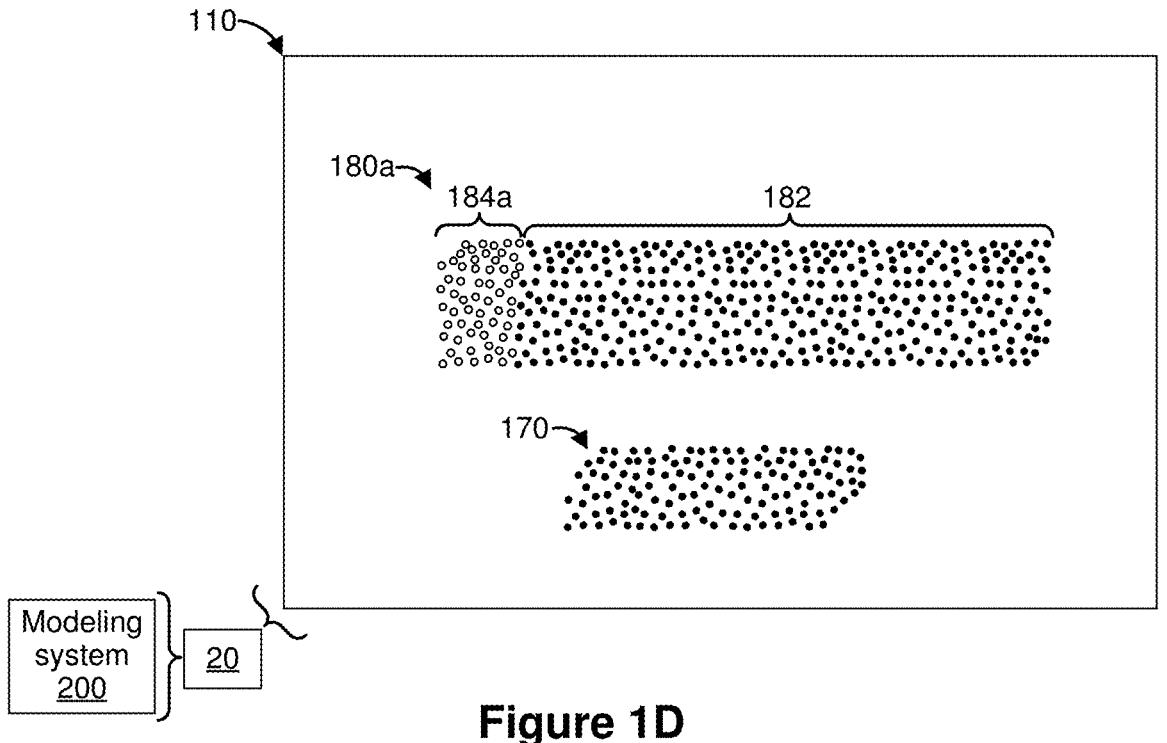

Referring to FIG. 1D, in some implementations, the modeling system 200 generates point clouds for the first candidate virtual couch 140a and the virtual coffee table 150. For example, as shown in FIG. 1D, the modeling system 200 generates a point cloud 170 for the virtual coffee table 150 and a point cloud 180a for the first candidate virtual couch 140a. As shown in FIG. 1D, the point cloud 180a includes a point cloud 182 for the first virtual couch portion 142 and a point cloud 184a for the first candidate shape 144a shown in FIG. 1C. In the example of FIG. 1D, the point cloud 184a for the first candidate shape 144a is shown with hollow circles because the first candidate shape 144a is an estimate of a portion of the couch 40 that is not represented by the environmental data 24 shown in FIG. 1A. By contrast, the point cloud 182 for the first virtual couch portion 142 is shown with solid circles because the first virtual couch portion 142 is represented by the environmental data 24 shown in FIG. 1A.

Figure 1E:
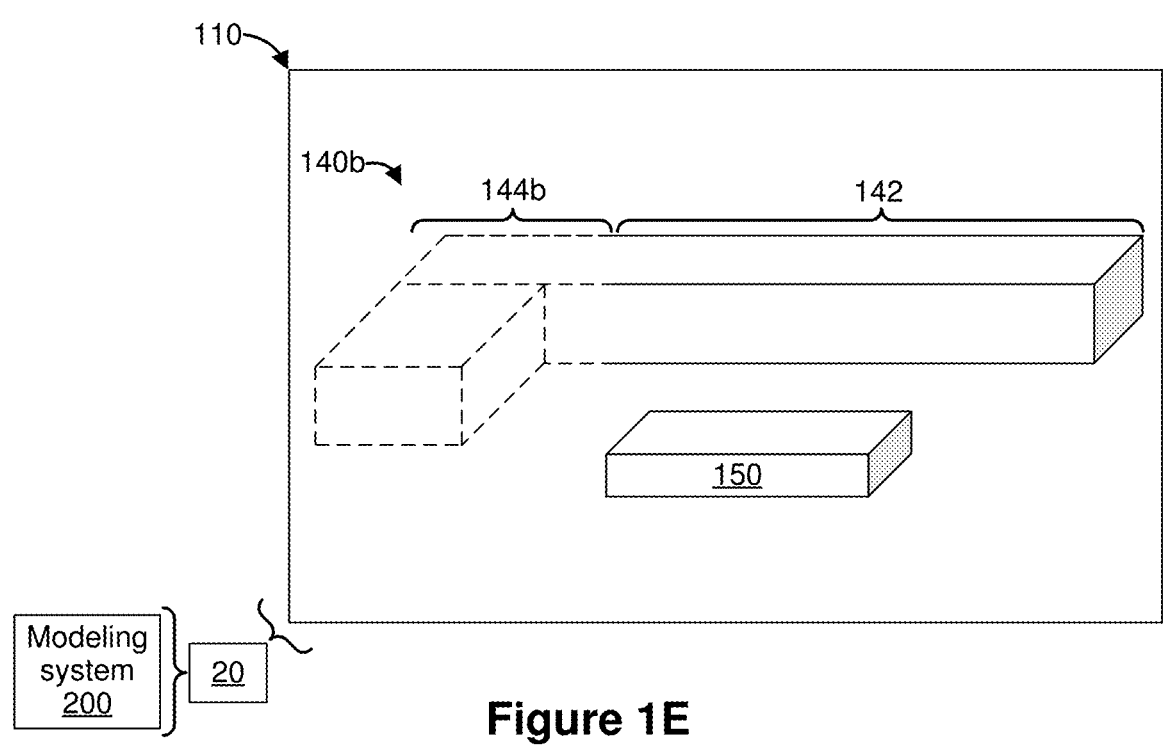

FIG. 1E illustrates a second candidate shape 144b that the modeling system 200 generates in order to model a portion of the couch 40 that is not represented by the environmental data 24 shown in FIG. 1A. In the example of FIG. 1E, the modeling system 200 generates the second candidate shape 144b based on a determination (e.g., an assumption) that the couch 40 is an L-shaped couch. As such, the modeling system 200 generates the second candidate shape 144b such that the first virtual couch portion 142 and the second candidate shape 144b collectively form a second candidate virtual couch 140b that is L-shaped. In some implementations, the determination that the couch 40 is L-shaped is based on knowledge regarding other environments with L-shaped couches.

Figure 1F:
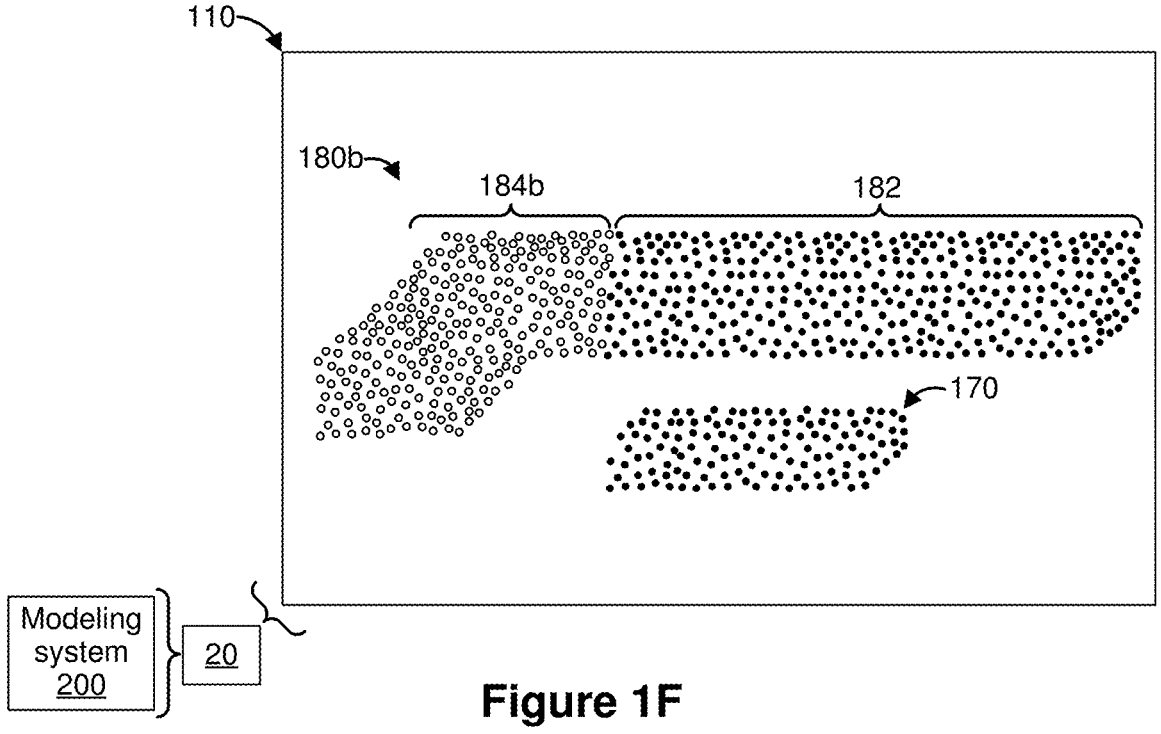

Referring to FIG. 1F, in some implementations, the modeling system 200 generates point clouds for the second candidate virtual couch 140b and the virtual coffee table 150. For example, as shown in FIG. 1F, the modeling system 200 generates the point cloud 170 for the virtual coffee table 150 and a point cloud 180b for the second candidate virtual couch 140b. As shown in FIG. 1F, the point cloud 180b includes the point cloud 182 for the first virtual couch portion 142 and a point cloud 184b for the second candidate shape 144b shown in FIG. 1E. In the example of FIG. 1F, the point cloud 184b for the second candidate shape 144b is shown with hollow circles because the second candidate shape 144b is an estimate of a portion of the couch 40 that is not represented by the environmental data 24 shown in FIG. 1A. By contrast, as described in relation to FIG. 1D, the point cloud 182 for the first virtual couch portion 142 is shown with solid circles because the first virtual couch portion 142 is represented by the environmental data 24 shown in FIG. 1A.

In some implementations, the electronic device 20 includes or is attached to a head-mountable device (HMD) worn by the user 30 shown in FIG. 1A. The HMD presents (e.g., displays) an XR environment (e.g., the graphical environment 110 shown in FIGS. 1B-1F) according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 20 can be attached to the head-mountable enclosure. In various implementations, the head-mountable enclosure is shaped to form a receptacle for receiving another device that includes a display (e.g., the electronic device 20). For example, in some implementations, the electronic device 20 slides/snaps into or otherwise attaches to the head-mountable enclosure. In some implementations, the display of the device attached to the head-mountable enclosure presents (e.g., displays) the XR environment. In various implementations, examples of the electronic device 20 include smartphones, tablets, media players, laptops, etc.

Figure 2:
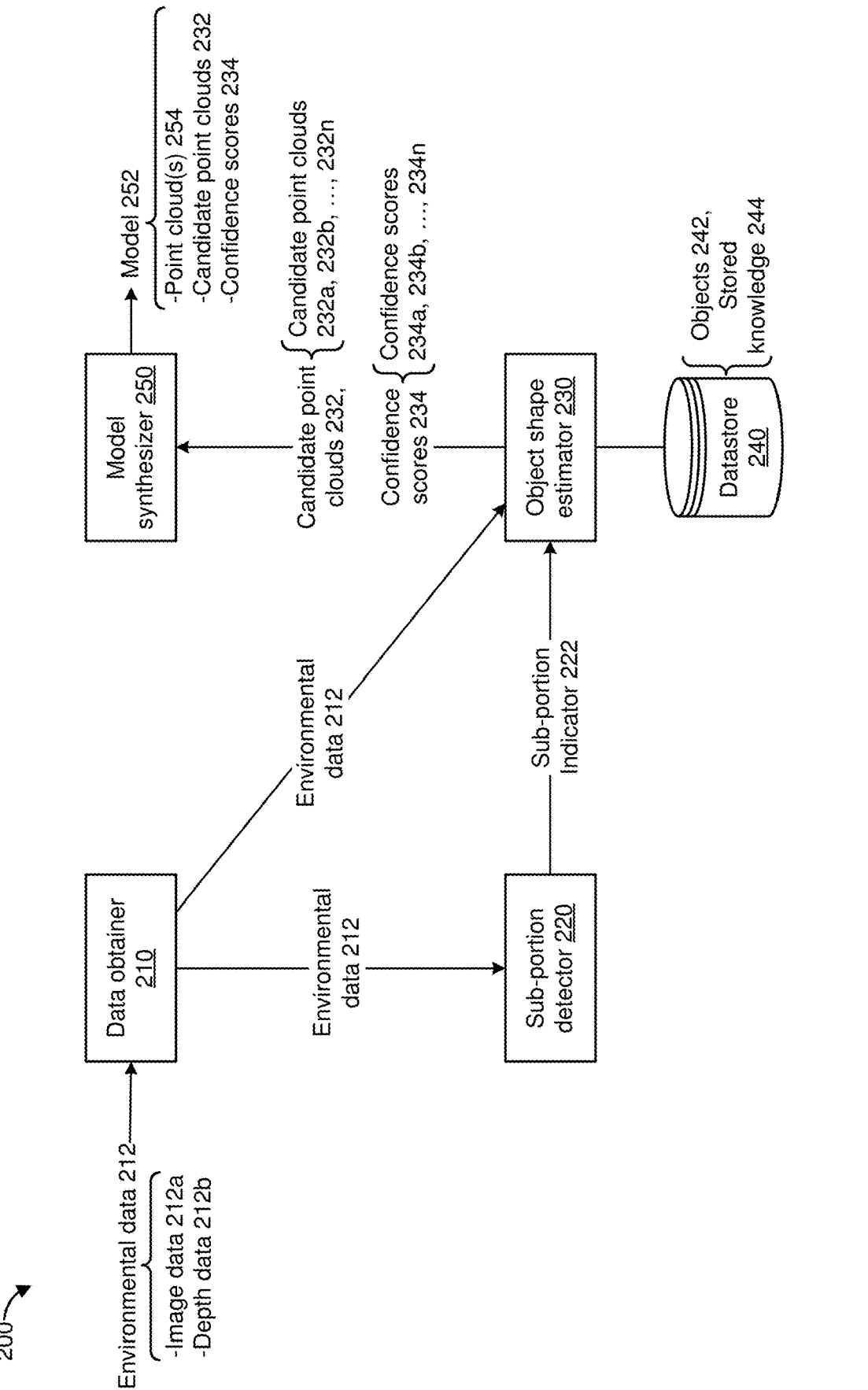
FIG. 2 is a block diagram of a modeling system that generates a model of an environment in accordance with some implementations.

FIG. 2 illustrates a block diagram of the modeling system 200 in accordance with some implementations. In some implementations, the modeling system 200 resides at the electronic device 20 shown in FIGS. 1A-1F. In some implementations, the modeling system 200 includes a data obtainer 210, a sub-portion detector 220, an object shape estimator 230, a datastore 240 and a model synthesizer 250.

In various implementations, the data obtainer 210 obtains environmental data 212 that corresponds to an environment. For example, in some implementations, the environmental data 212 includes the environmental data 24 shown in FIG. 1A. In some implementations, the environmental data 212 includes image data 212a that includes a set of one or more images. Additionally or alternatively, in some implementations, the environmental data 212 includes depth data 212b. In some implementations, the data obtainer 210 receives the environmental data 212 from an environmental sensor. For example, in some implementations, the data obtainer 210 receives the image data 212a from an image sensor (e.g., a camera) and/or the depth data 212b from a depth sensor (e.g., a depth camera). In various implementations, the data obtainer 210 provides the environmental data 212 to the sub-portion detector 220 and/or to the object shape estimator 230.

In various implementations, the sub-portion detector 220 determines whether the environmental data 212 includes environmental data that corresponds to a portion of an object and not an entirety of the object. For example, in some implementations, the sub-portion detector 220 determines whether the environmental data 212 includes environmental data that corresponds to a part of an object while missing environmental data that corresponds to a remainder of the object. As an example, referring to FIGS. 1A and 1B, the sub-portion detector 220 determines that the environmental data 24 includes environmental data that corresponds to the first portion 42 of the couch 40 and that the environmental data 24 is missing environmental data that corresponds to another portion (e.g., the second portion 44) of the couch 40.

In some implementations, the sub-portion detector 220 determines that the environmental data 212 includes environmental data that corresponds to a sub-portion of an object and not an entirety of the object based on information stored in the datastore 240. In some implementations, the datastore 240 stores data representations of various objects 242 (hereafter "objects 242"). For example, in some implementations, the datastore 240 includes an object store that stores the objects 242. In some such implementations, the sub-portion detector 220 determines that the environmental data 212 includes environmental data that corresponds to a sub-portion of an object and not an entirety of the object by comparing the environmental data 212 with at least a subset of the objects 242 stored in the datastore 240. As an example, referring to FIGS. 1A and 1B, in some implementations, the sub-portion detector 220 determines that the environmental data 24 includes environmental data corresponding to a sub-portion of a couch and not an entirety of the couch by comparing the environmental data 24 with various couch objects stored in the datastore 240.

In some implementations, the datastore 240 stores knowledge 244 regarding a set of one or more environments (hereafter "stored knowledge 244"). In some implementations, the stored knowledge 244 indicates shapes of objects in other environments that are similar to the environment represented by the environmental data 212. For example, referring to FIG. 1A, in some implementations, the stored knowledge 244 indicates shapes of couches that are in living rooms that are similar to the physical environment 10 shown in FIG. 1A. In some implementations, the sub-portion detector 220 determines that the environmental data 212 is missing environmental data for a portion of an object based on a difference between an object indicated by the stored knowledge 244 and a portion of the object represented by the environmental data 212. For example, referring to FIG. 1A, the sub-portion detector 220 determines that the environmental data 24 is missing environmental data for a portion of the couch 40 based on a difference between a couch object indicated by the stored knowledge 244 and the first portion 42 represented in the environmental data 212.

In various implementations, the sub-portion detector 220 provides a sub-portion indicator 222 to the object shape estimator 230. In some implementations, the sub-portion indicator 222 indicates that the environmental data 212 is missing environmental data for a portion of an object. In various implementations, the object shape estimator 230 determines candidate shapes for the missing portion (e.g., a non-visible portion, for example, an occluded portion) of the object. In some implementations, the object shape estimator 230 generates respective candidate point clouds 232 for the candidate shapes. For example, the object shape estimator 230 generates a first candidate point cloud 232a, a second candidate point cloud 232b, . . . , and an nth candidate point cloud 232n. In some implementations, the object shape estimator 230 generates respective confidence scores 234 for the corresponding candidate point clouds 232. For example, the object shape estimator 230 generates a first confidence score 234a for the first candidate point cloud 232a, a second confidence score 234b for the second candidate point cloud 232b, . . . , and an nth confidence score 234n for the nth candidate point cloud 232n. In some implementations, the confidence score 234 for a particular candidate point cloud 232 indicates a degree of certainty that the missing portion of the object can be represented by that particular candidate point cloud 232.

In some implementations, the object shape estimator 230 generates candidate shapes for a missing portion of an object and the candidate point clouds 232 for the missing portion based on the environmental data 212. In some implementations, the object shape estimator 230 generates a candidate shape by extrapolating a geometric feature of a portion of the object that is represented by the environmental data 212. For example, referring to FIG. 1C, in some implementations, the object shape estimator 230 extrapolates (e.g., extends) lines of the first virtual couch portion 142 in order to generate the first candidate shape 144a.

In some implementations, the object shape estimator 230 generates a candidate shape based on the objects 242 stored in the datastore 240. For example, the object shape estimator 230 generates a candidate shape such that an amalgamation of the candidate shape and the portion of the object that is represented by the environmental data 212 is similar to one of the objects 242 stored in the datastore 240. For example, referring to FIG. 1C, in some implementations, the object shape estimator 230 generates the first candidate shape 144a such that the first candidate virtual couch 140a is similar to a couch object stored in the datastore 240.

In some implementations, the object shape estimator 230 generates a candidate shape based on the stored knowledge 244. In some implementations, the stored knowledge 244 indicates shapes of objects in environments that are similar to the environment represented by the environmental data 212. In such implementations, the object shape estimator 230 generates a candidate shape such that an amalgamation of the candidate shape and the portion of the object that is represented by the environmental data 212 is similar to an object in a similar environment. For example, referring to FIG. 1E, in some implementations, the object shape estimator 230 generates the second candidate shape 144b such that the second candidate virtual couch 140b is similar to an L-shaped couch in a living room that is similar to the physical environment 10 represented by the environmental data 24 shown in FIG. 1A.

In some implementations, the confidence scores 234 are based on corresponding amounts of estimations that the object shape estimator 230 made in order to generate the candidate point clouds 232. In some implementations, the confidence scores 234 are proportional to an amount of extrapolations that the object shape estimator 230 made in order to generate the candidate point clouds 232. For example, in some implementations, the confidence score 234 for the first candidate shape 144a shown in FIG. 1C is greater than the confidence score 234 for the second candidate shape 144b shown in FIG. 1E, for example, because generating the first candidate shape 144a required fewer estimations (e.g., smaller extrapolations) than the second candidate shape 144b.

In various implementations, the model synthesizer 250 generates a model 252 that includes a set of one or more point clouds 254 for objects represented by the environmental data 212, the candidate point clouds 232 for objects not represented by the environmental data 212 and the confidence scores 234 for the candidate point clouds 232. For example, in some implementations, the model 252 includes the point cloud 170 (shown in FIGS. 1D and 1F) for the coffee table 50 (shown in FIG. 1A), the point cloud 182 (shown in FIGS. 1D and 1F) for the first portion 42 of the couch 40 (shown in FIG. 1A), the point cloud 184a (shown in FIG. 1D) for the first candidate shape 144a (shown in FIG. 1C), and the point cloud 184b (shown in FIG. 1F) for the second candidate shape 144b (shown in FIG. 1E).

Figure 3:
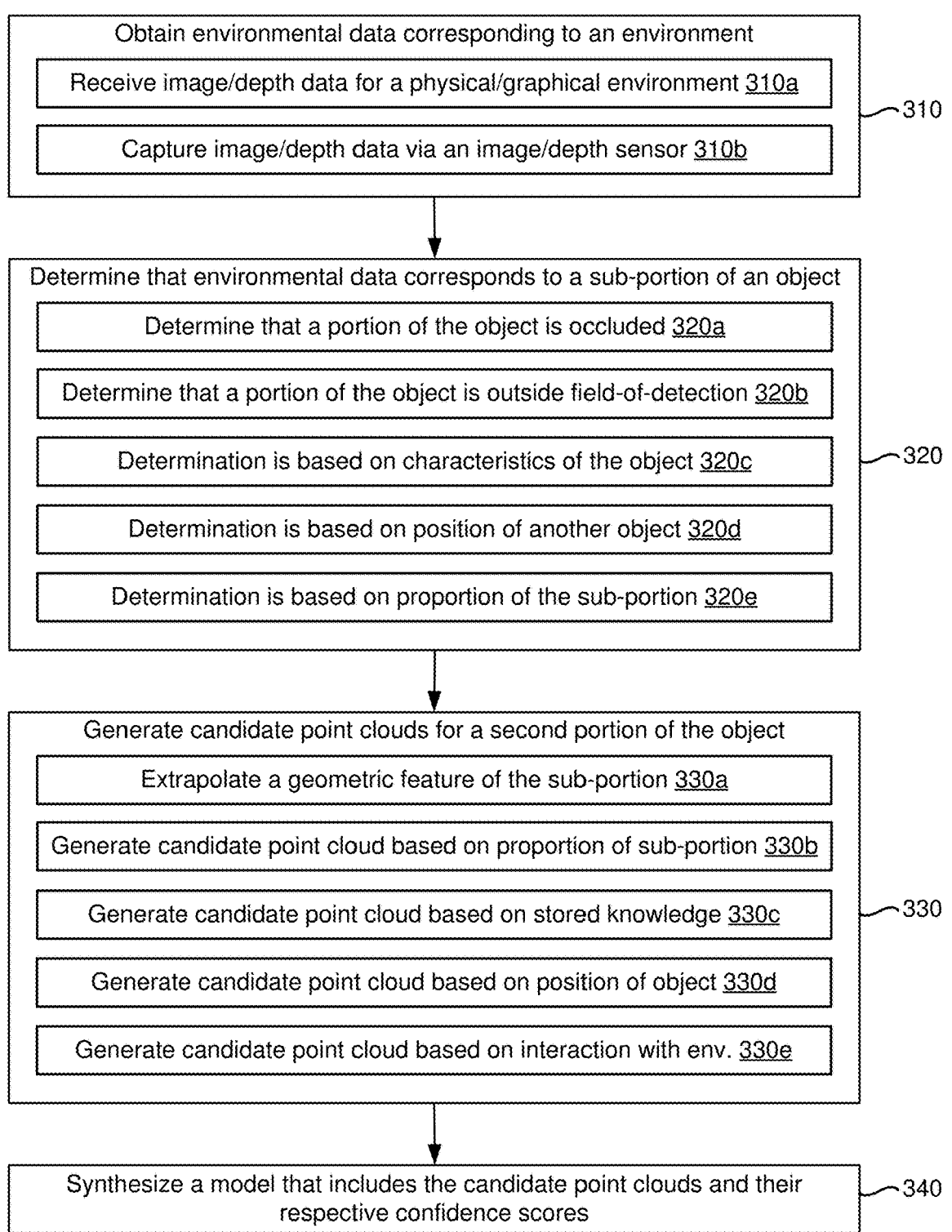
FIG. 3 is a flowchart representation of a method of synthesizing a model of an environment in accordance with some implementations.

FIG. 3 is a flowchart representation of a method 300 for synthesizing a model of an environment. In various implementations, the method 300 is performed by a device (e.g., the electronic device 20 shown in FIGS. 1A-1F and/or the modeling system 200 shown in FIGS. 1A-2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining, via the environmental sensor, environmental data corresponding to an environment. For example, as shown in FIG. 1A, the electronic device 20 and/or the modeling system 200 obtain the environmental data 24. As another example, as shown in FIG. 2, the data obtainer 210 obtains the environmental data 212. In some implementations, the environmental sensor includes a depth sensor, and obtaining the environmental data includes receiving depth data from the depth sensor. For example, as shown in FIG. 2, in some implementations, the environmental data 212 includes the depth data 212b. In some implementations, the environmental sensor includes an image sensor, and obtaining the environmental data includes receiving image data from the image sensor. For example, as shown in FIG. 2, in some implementations, the environmental data 212 includes the image data 212a.

As represented by block 310a, in some implementations, the environment is a physical environment, and obtaining the environmental data includes receiving image data or depth data corresponding to the physical environment. As represented by block 310b, in some implementations, the environment is a graphical environment, and obtaining the environmental data includes receiving image data corresponding to the graphical environment.

As represented by block 320, in some implementations, the method 300 includes determining that the environmental data corresponding to the environment includes environmental data that corresponds to a first portion of an object that represents a sub-portion of the object and not an entirety of the object. For example, as shown in FIG. 1A, the environmental data 24 includes environmental data (e.g., image data and/or depth data) that corresponds to the first portion 42 of the couch 40 and not the second portion 44 of the couch 40.

As represented by block 320a, in some implementations, the second portion of the object is occluded. For example, in some implementations, another object is blocking a line of sight between the second portion of the object and the environmental sensor.

As represented by block 320b, in some implementations, the first portion of the object is in a field-of-view of the environmental sensor and the second portion of the object is not in the field-of-view of the environmental sensor. For example, as shown in FIG. 1A, the first portion 42 of the couch 40 is in the field-of-detection 22 and the second portion 44 of the couch 40 is not in the field-of-detection 22.

As represented by block 320c, in some implementations, the determination that the first portion represents a sub-portion of the object and not the entirety of the object is based on one or more characteristics of the first portion of the object. In some implementations, the characteristics include physical characteristics such as dimension, color, material, etc. In some implementations, the characteristics include functional characteristics such as capabilities of the sub-portion that rely on another portion of the object that is not represented by the environmental data. In some implementations, a characteristic of the first portion indicates that the object includes a second portion that is not represented by the environmental data. For example, in some implementations, the environmental data indicates that the first portion of the object is attached to (e.g., is resting on or is supported by) another portion of the object that is not represented by the environmental data. As an example, the environmental data includes pixels corresponding to a table top of a table and two legs of the table, and not pixels corresponding to a third leg and a fourth leg of the table.

As represented by block 320d, in some implementations, the determination that the first portion represents a sub-portion of the object and not the entirety of the object is based on a position of another object in the environment. For example, in some implementations, the environmental data indicates that another object that is typically positioned towards a center of a supporting object is positioned towards an end of the first portion. For example, a vase that is typically placed at a center of a table is towards an edge of a portion of the table that is represented by the environmental data thereby indicating that the environmental data represents a sub-portion of the table and not an entirety of the table. As another example, an image indicates that a person is resting his legs on an unseen object that is adjacent to the portion of the table captured by the image may indicate that the environmental data represents a sub-portion of the table and not an entirety of the table.

As represented by block 320c, in some implementations, the determination that the first portion represents a sub-portion of the object and not the entirety of the object is based on a proportion of the first portion of the object. For example, two visible legs of a table may have a thickness that is indicative of a relatively large table, however a visible portion of table is smaller than an expected size thereby indicating that the table is larger than what is visible.

As represented by block 330, in some implementations, the method 300 includes generating a plurality of candidate point clouds for a second portion of the object based on the environmental data corresponding to the first portion of the object. In some implementations, the plurality of candidate point clouds are associated with corresponding confidence scores. For example, as shown in FIGS. 1C and 1D, the modeling system 200 generates a first candidate shape 144a and the point cloud 184a for the first candidate shape 144a. As another example, as shown in FIGS. 1E and 1F, the modeling system 200 generates a second candidate shape 144b and the point cloud 184b for the second candidate shape 144b. As another example, as shown in FIG. 2, the object shape estimator 230 generates the candidate point clouds 232 and their corresponding confidence scores 234.

As represented by block 330a, in some implementations, generating the plurality of candidate point clouds includes generating at least one of the plurality of candidate point clouds by extrapolating a geometric feature of the first portion of the object. In some implementations, the method 300 includes extrapolating linear features of the first portion of the object in order to generate a candidate for the second portion of the object. For example, as shown in FIG. 1C, the modeling system 200 extrapolates the linear features of the first virtual couch portion 142 in order to generate the first candidate shape 144a.

As represented by block 330b, in some implementations, generating the plurality of candidate point clouds includes generating at least one of the plurality of candidate point clouds based on a proportion of the first portion of the object. In some implementations, the method 300 includes generating a candidate for a second portion of the object such that a proportion of different dimensions of the object matches a proportion of corresponding dimensions of another similar object. For example, referring to FIG. 1C, in some implementations, the modeling system 200 generates the first candidate shape 144a such that a proportion of a width and a depth of the first candidate virtual couch 140a matches a proportion of a width and a depth of a couch that is similar to the first candidate virtual couch 140a.

As represented by block 330c, in some implementations, generating the plurality of candidate point clouds includes generating at least one of the plurality of candidate point clouds based on stored knowledge regarding the environment. In some implementations, the method 300 includes estimating a dimension of the second portion of the object based on a known dimension of the environment. For example, as described in relation to FIG. 2, in some implementations, the object shape estimator 230 determines a candidate shape based on the stored knowledge 244.

As represented by block 330d, in some implementations, generating the plurality of candidate point clouds includes generating at least one of the plurality of candidate point clouds based on a position of the object within the environment. For example, as described in relation to FIGS. 1C and 1D, the modeling system 200 determines the first candidate shape 144a based on the position of the virtual coffee table 150 relative to the first virtual couch portion 142.

As represented by block 330e, in some implementations, generating the plurality of candidate point clouds includes generating at least one of the plurality of candidate point clouds based on an interaction of the object with another object. As an example, if the environmental data indicates that a virtual character is resting its feet on an object that is proximate to the first portion, the device determines that the virtual character may be resting its feet on the second portion of the object. As such, in this example, a candidate shape for the second portion of the object is generated based on the interaction of the virtual character with the object.

In some implementations, generating the plurality of candidate point clouds includes providing a portion of the environmental data corresponding to the first portion of the object to a neural network system, and receiving the plurality of candidate point clouds and the corresponding confidence scores as outputs of the neural network system. For example, referring to FIG. 2, in some implementations, the object shape estimator 230 includes a neural network system that accepts the environmental data 212, the sub-portion indicator 222, the objects 242 and/or the stored knowledge 244 as inputs, and generates the candidate point clouds 232 and the confidence scores 234 as outputs.

As represented by block 340, in some implementations, the method 300 includes synthesizing a model of the environment that includes a point cloud representing the first portion of the object, at least a subset of the plurality of candidate point clouds for the second portion of the object and the corresponding confidence scores associated with the subset of the plurality of candidate point clouds. For example, as shown in FIG. 2, the model 252 includes the point cloud(s) 254, the candidate point clouds 232 and the confidence scores 234. In some implementations, the subset includes candidate point clouds with confidence scores that are greater than a threshold score and not candidate point clouds with confidence scores that are less than the threshold score.

Figure 4:
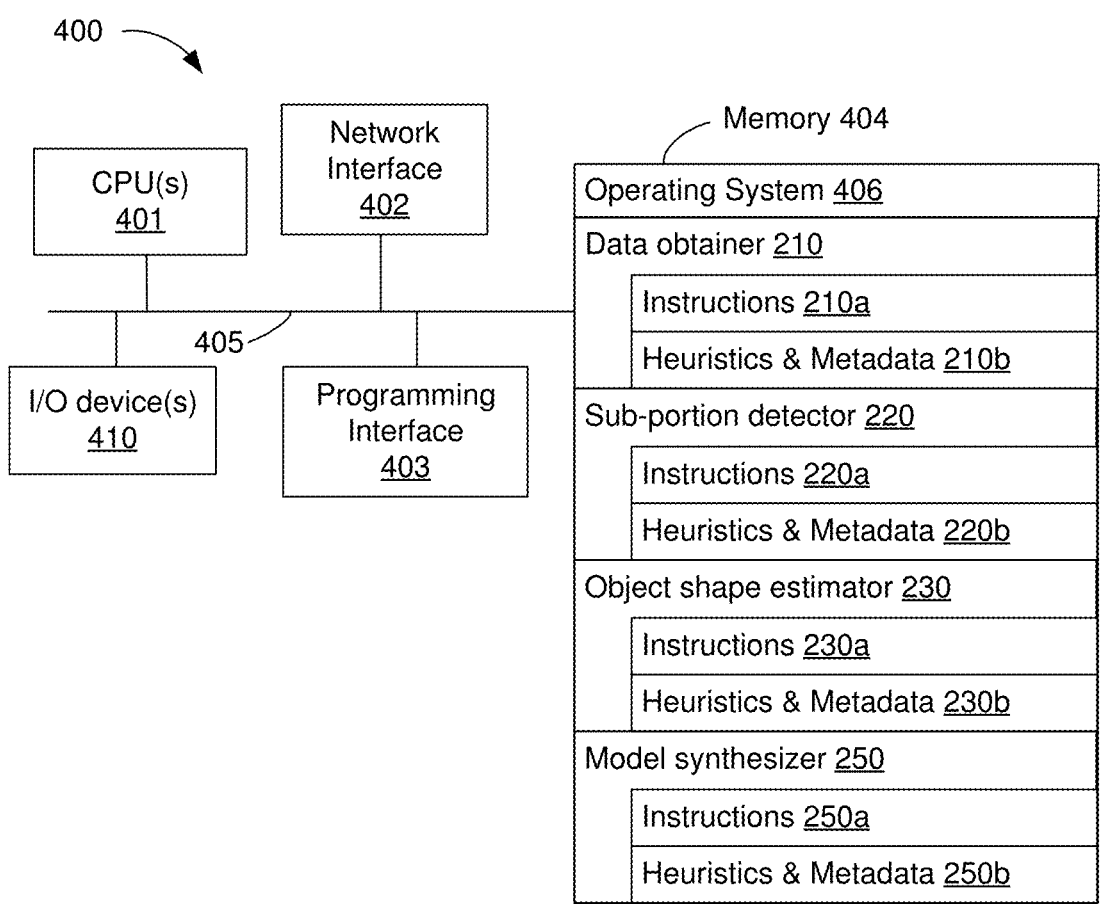
FIG. 4 is a block diagram of a device that synthesizes a model of an environment in accordance with some implementations.

FIG. 4 is a block diagram of a device 400 in accordance with some implementations. In some implementations, the device 400 implements the electronic device 20 shown in FIGS. 1A-1F and/or the modeling system 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the sub-portion detector 220, the object shape estimator 230 and the model synthesizer 250. In various implementations, the device 400 performs the method 300 shown in FIG. 3.

In some implementations, the data obtainer 210 includes instructions 210a, and heuristics and metadata 210b for obtaining environmental data. In some implementations, the data obtainer 210 performs at least some of the operation(s) represented by block 310 in FIG. 3.

In some implementations, the sub-portion detector 220 includes instructions 220a, and heuristics and metadata 220b for determining whether the environmental data includes environmental data that corresponds to a sub-portion of an object and not an entirety of the object. In some implementations, the sub-portion detector 220 performs at least some of the operation(s) represented by block 320 in FIG. 3.

In some implementations, the object shape estimator 230 includes instructions 230a, and heuristics and metadata 230b for generating candidate shapes for a second portion of the object that is not represented by the environmental data. In some implementations, the object shape estimator 230 performs at least some of the operation(s) represented by block 330 in FIG. 3.

In some implementations, the model synthesizer 250 includes instructions 250a, and heuristics and metadata 250b for synthesizing a model that includes candidate point clouds that correspond to the candidate shapes and their corresponding confidence scores. In some implementations, the model synthesizer 250 performs at least some of the operation(s) represented by block 340 in FIG. 3.

In some implementations, the one or more I/O devices 410 include an environmental sensor for obtaining environmental data. In some implementations, the environmental sensor includes a depth sensor (e.g., a depth camera) and/or an image sensor (e.g., a camera, for example, a visible light camera or an infrared light camera). In some implementations, the environmental sensor includes a physical sensor for sensing physical environments. In some implementations, the environmental sensor includes a virtual sensor for sensing virtual environments. In some implementations, the one or more I/O devices 410 include a display for displaying a model (e.g., the model 252 shown in FIG. 2).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Generating a single plan based on a fixed model that does not accurately represent an environment may result in actions for an agent that do not satisfy an objective of the agent. For example, referring to FIG. 1B, if an objective of an agent is to rest on the first virtual couch portion 142, the resulting action may be for the agent to sit on the first virtual couch portion 142 instead of lying down on the first virtual couch portion 142 due to a length of the first virtual couch portion 142 being insufficient for the agent to lie down. In this example, the agent may not fully satisfy its objective of resting because sitting may not be as restful as lying down. More generally, if a fixed model does not include a portion of an object that the agent needs to use in order to satisfy its objective, the plan may not result in actions that satisfy the objective because the plan may not trigger actions that use the portion of the object that is not in the model.

The present disclosure provides methods, systems, and/or devices for switching between conditional plans for an agent based on environmental data. A device obtains a model that includes candidate point clouds for at least a portion of an environment of the agent. The device generates a set of conditional plans for the agent based on the candidate point clouds in the model. The device selects a first one of the conditional plans based on confidence scores associated with the candidate point clouds. For example, the device initially selects a conditional plan that corresponds to the candidate point cloud with the greatest confidence score. After initially selecting a conditional plan based on the confidence scores, the device generates a set of one or more actions for the agent in accordance with the selected conditional plan.

As the agent performs the actions, the device obtains environmental data regarding the environment. The environmental data may indicate which of the candidate point clouds more closely match the environment. If the environmental data indicates that the environment matches a candidate point cloud that corresponds to a second one of the conditional plans, the device switches from the first conditional plan to the second conditional plan. After switching from the first conditional plan to the second conditional plan, the device generates a second set of actions for the agent in accordance with the second conditional plan. The device triggers the agent to perform the second set of actions. If the agent has performed a subset of the first set of actions and not an entirety of the first set of actions, the device can instruct the agent to abandon a remainder of the first set of actions and instead perform the second set of actions.

Figure 5A:
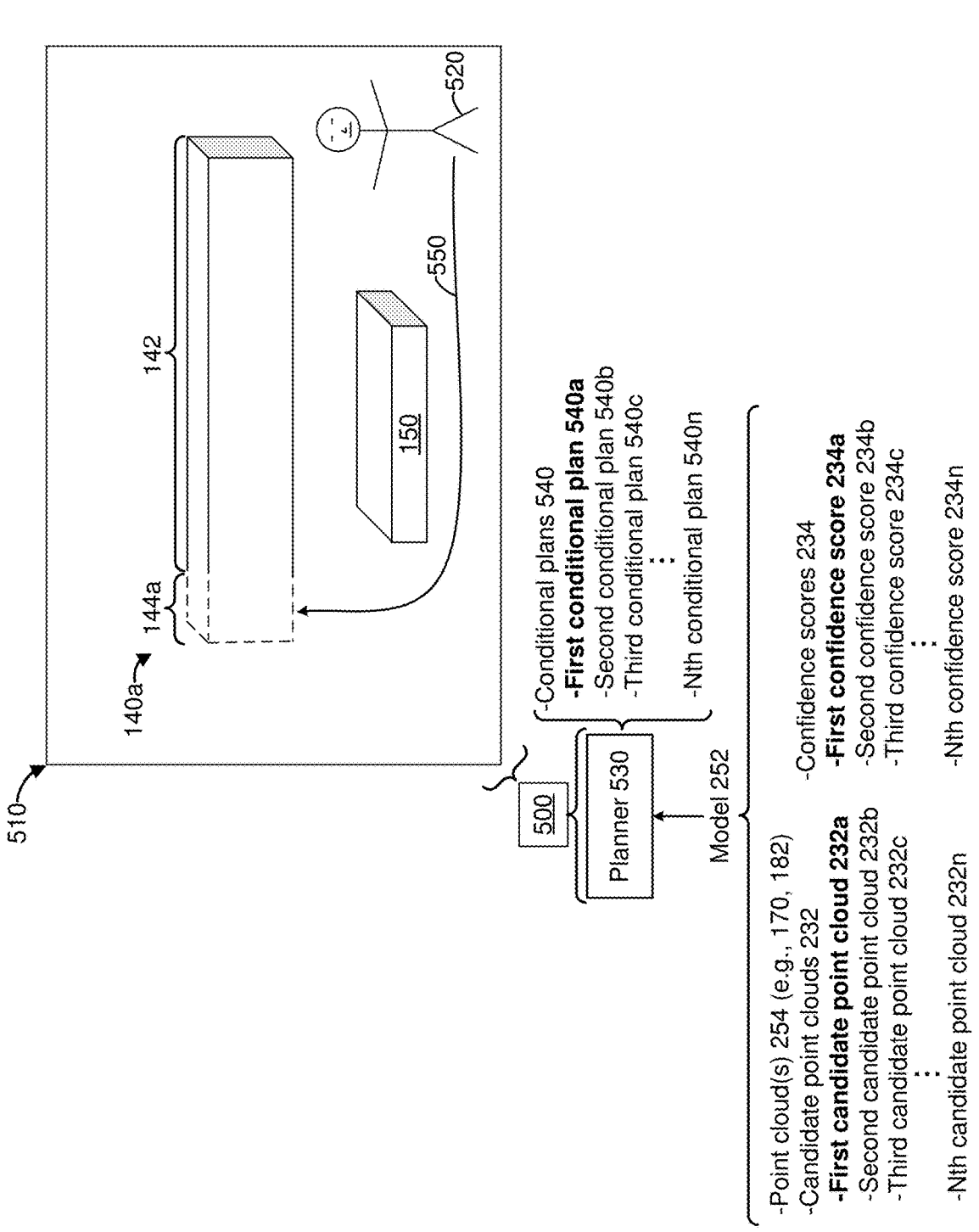
FIGS. 5A and 5B are diagrams that illustrate example conditional plans in accordance with some implementations.

FIG. 5A is a diagram that illustrates an operating environment that includes an electronic device 500 and a planner 530. In some implementations, the electronic device 500 includes a handheld computing device that can be held by a user (e.g., the user 30 shown in FIG. 1A). For example, in some implementations, the electronic device 500 includes a smartphone, a tablet, a media player, a laptop, or the like. In some implementations, the electronic device 500 includes a wearable computing device that can be worn by the user. For example, in some implementations, the electronic device 500 includes a head-mountable device (HMD) or an electronic watch.

In the example of FIG. 5A, the planner 530 resides at the electronic device 500. For example, the electronic device 500 implements the planner 530. In some implementations, the electronic device 500 includes a set of computer-readable instructions corresponding to the planner 530. Although the planner 530 is shown as being integrated into the electronic device 500, in some implementations, the planner 530 is separate from the electronic device 500. For example, in some implementations, the planner 530 resides at another device (e.g., at a controller, a server or a cloud computing platform).

In various implementations, the electronic device 500 and/or planner 530 obtain (e.g., receive) the model 252. In some implementations, the electronic device 500 generates and presents (e.g., displays) an XR environment 510 (e.g., a graphical environment) based on the model 252. In some implementations, the model 252 includes various point clouds 254, for example, the point cloud 170 representing the coffee table 50 shown in FIG. 1A and the point cloud 182 representing the first portion 42 of the couch 40 shown in FIG. 1A. In some implementations, the electronic device 500 generates and presents the first virtual couch portion 142 based on the point cloud 182 and the virtual coffee table 150 based on the point cloud 170.

In some implementations, the electronic device 500 and/or the planner 530 select one of the candidate point clouds 232 based on their respective confidence scores 234. In some implementations, the electronic device 500 and/or the planner 530 select a particular one of the candidate point clouds 232 that is associated with the greatest confidence score 234. In the example of FIG. 5A, the electronic device 500 and/or the planner 530 select the first candidate point cloud 232a, for example, because the first confidence score 234a is greater than the other confidence scores 234.

In various implementations, the electronic device 500 and/or the planner 530 display a virtual object based on a selected one of the candidate point clouds 232. In the example of FIG. 5A, the electronic device 500 generates the first candidate shape 144a based on the first candidate point cloud 232a, and presents the first candidate shape 144a. In some implementations, the electronic device 500 varies an appearance of the virtual object that is generated based on one of the candidate point clouds 232 in order to indicate that the virtual object is based on limited environmental data. For example, as shown in FIG. 5A, in some implementations, the electronic device 500 presents the first candidate shape 144a with dashed lines (e.g., instead of solid lines). Although the first candidate shape 144a is shown with dashed lines, in some implementations, the electronic device 500 displays the first candidate shape 144a with solid lines. As described in FIG. 1C, the first virtual couch portion 142 and the first candidate shape 144a collectively form the first candidate virtual couch 140a.

In some implementations, the XR environment 510 includes an XR representation of an intelligent agent (hereafter "agent"). In the example of FIG. 5A, the XR environment 510 includes an XR person that represents an agent (hereafter "agent 520"). In some implementations, the agent 520 is associated with an objective, and the planner 530 generates a plan for the agent 520 to advance towards satisfying (e.g., accomplishing) the objective. As an example, an objective of the agent 520 may be to rest.

Since the model 252 includes various candidate point clouds 232, the planner 530 generates a set of conditional plans 540, for example, instead of a single plan. For example, as shown in FIG. 5A, the planner 530 generates a first conditional plan 540a for the first candidate point cloud 232a, a second conditional plan 540b for the second candidate point cloud 232b, a third conditional plan 540c for the third candidate point cloud 232c, . . . , and an nth conditional plan 540n for the nth candidate point cloud 232n.

In the example of FIG. 5A, the electronic device 500 generates a set of one or more actions in accordance with the first conditional plan 540a. As shown in FIG. 5A, one of the actions generated in accordance with the first conditional plan 540a is for the agent 520 to sit on the first candidate shape 144a. In the example of FIG. 5A, in accordance with the first conditional plan 540a, the electronic device 500 instructs the agent 520 to move along a first path 550 and sit on the first candidate shape 144a. More generally, in various implementations, the planner 530 selects a particular one of the conditional plans 540, and the electronic device 500 generates a set of one or more actions in accordance with the particular conditional plan 540 that the planner 530 selected.

Figure 5B:
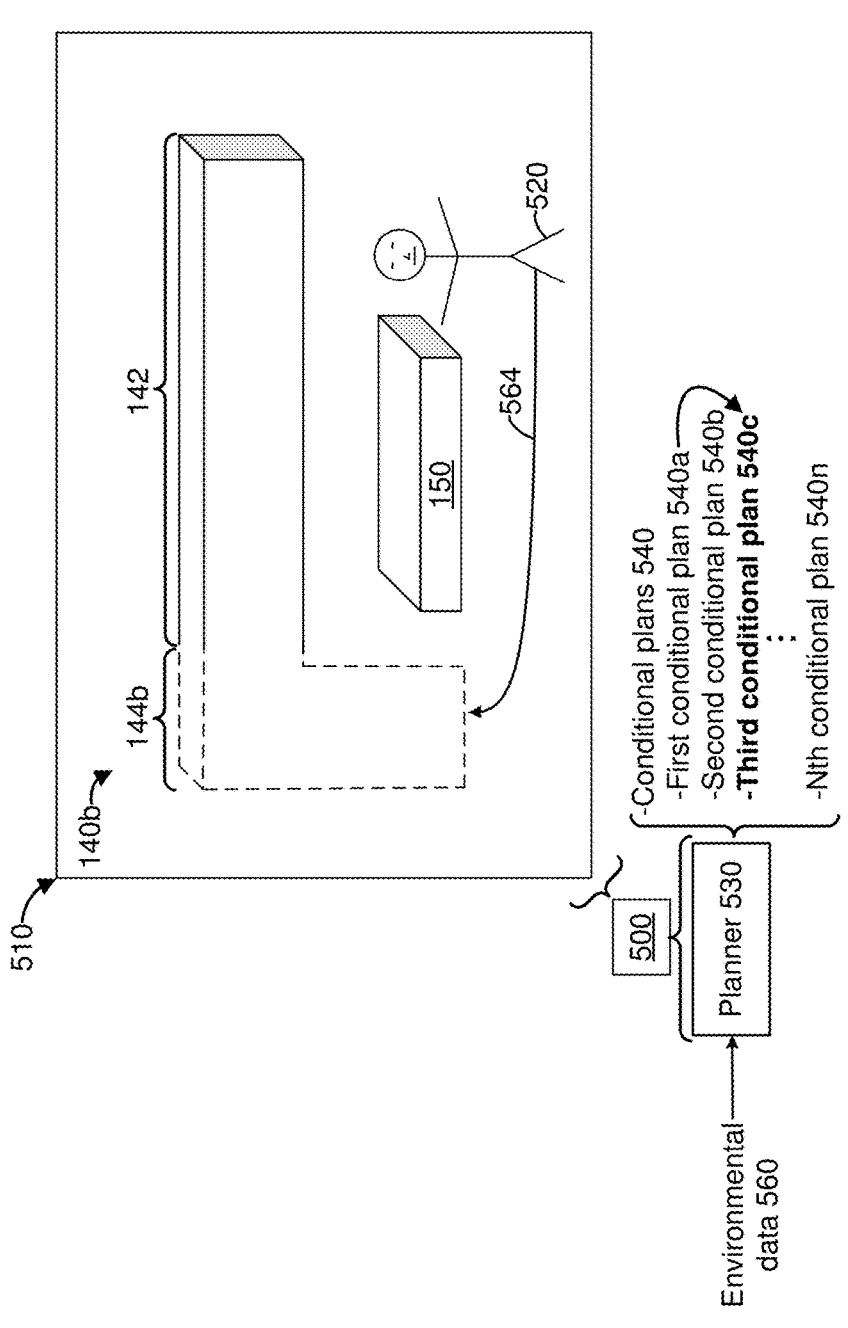

Referring to FIG. 5B, in some implementations, the planner 530 switches between conditional plans 540 based on environmental data 560 that the planner 530 obtains. In some implementations, the environmental data 560 includes ray cast data that the agent 520 collects as the agent 520 starts moving along the first path 550 shown in FIG. 5A. In some implementations, the environmental data 560 includes image data and/or depth data that the planner 530 obtains as the agent 520 performs a set of one or more actions in accordance with the first conditional plan 540*a*. In some implementations, the environmental data 560 includes information that was not available when the modeling system 200 (shown in FIGS. 1A-2) synthesized the model 252 (shown in FIGS. 2 and 5A).

In the example of FIG. 5B, the planner 530 switches from the first conditional plan 540*a* to the third conditional plan 540*c* based on the environmental data 560. For example, the planner 530 switches from the first conditional plan 540*a* to the third conditional plan 540*c* because the environmental data 560 indicates that a portion of the environment that the XR environment 510 is modeled after (e.g., the physical environment 10 shown in FIG. 1A) more closely resembles the third candidate point cloud 232*c*. As such, the electronic device 500 replaces display of the first candidate shape 144*a* with the second candidate shape 144*b*. Although the second candidate shape 144*b* is shown with dashed lines, in some implementations, the electronic device 500 displays the second candidate shape 144*b* with solid lines such that visual appearances of the first virtual couch portion 142 and the second candidate shape 144*b* match.

In some implementations, after switching from the first conditional plan 540*a* to the third conditional plan 540*c*, the electronic device 500 generates a second set of one or more actions for the agent 520 in accordance with the third conditional plan 540*c*. For example, as shown in FIG. 5B, the electronic device 500 instructs the agent 520 to move along a second path 564 and sit on an edge of the L-shaped couch represented by the second candidate shape 144*b*. In some implementations, the electronic device 500 instructs the agent 520 to abandon actions that were based on a previously-selected conditional plan. For example, the electronic device 500 instructs the agent 520 to abandon moving along the first path 550 shown in FIG. 5A and instead move along the second path 564 shown in FIG. 5B.

Figure 6A:
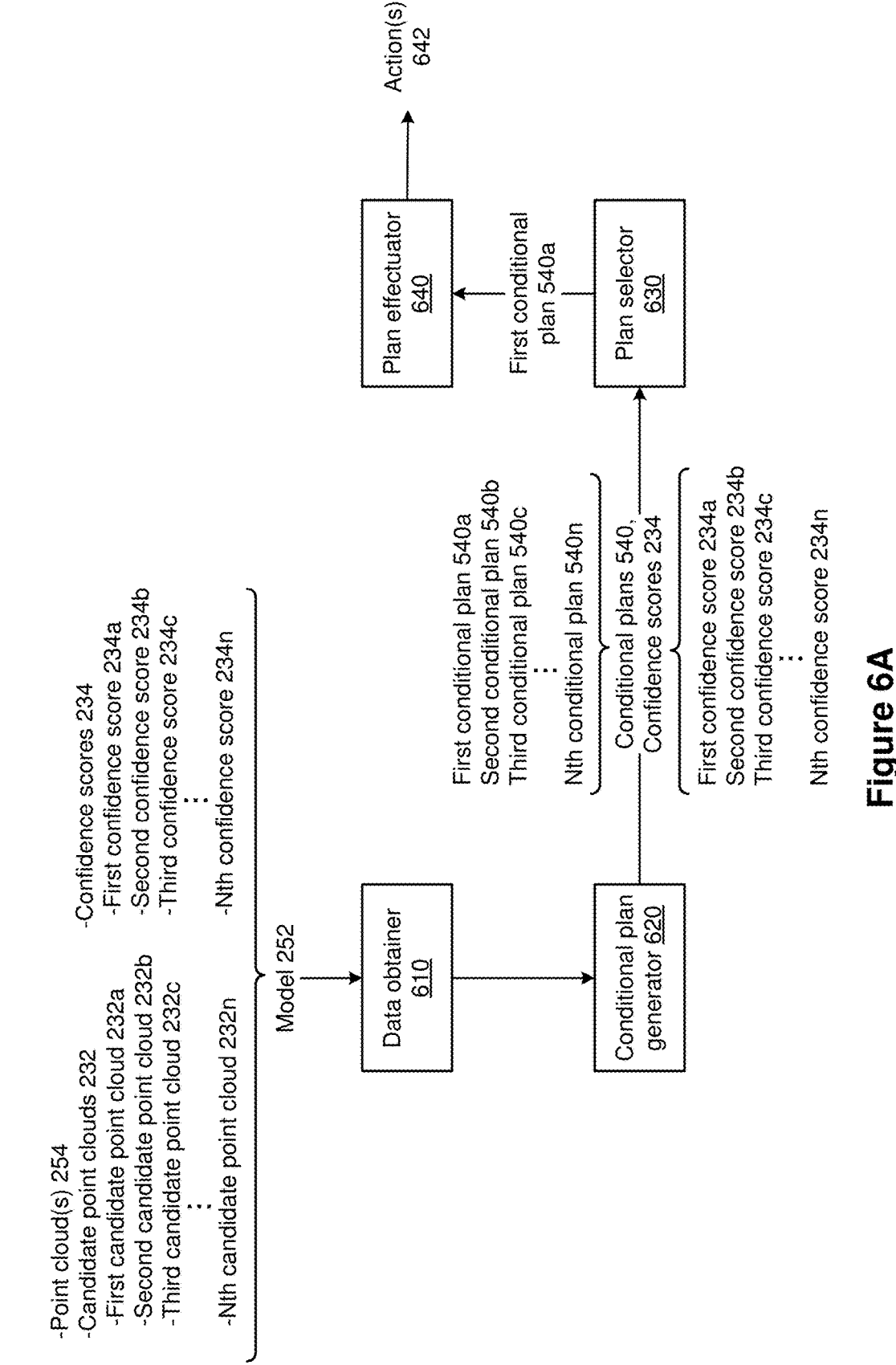
FIGS. 6A and 6B are block diagrams of a planner that generates a set of conditional plans in accordance with some implementations.

FIG. 6A illustrates a block diagram of an example planner 600. In some implementations, the planner 600 implements the planner 530 shown in FIGS. 5A and 5B. In various implementations, the planner 600 generates the conditional plans 540 for an agent (e.g., the agent 520 shown in FIGS. 5A and 5B) in order to allow the agent to advance towards satisfying an objective of the agent. In various implementations, the planner 600 includes a data obtainer 610, a conditional plan generator 620, a plan selector 630 and a plan effectuator 640. In various implementations, the data obtainer 610 obtains the model 252. For example, in some implementations, the data obtainer 610 receives the model 252 from the modeling system 200 shown in FIGS. 1A-2. In some implementations, the data obtainer 610 provides the model 252 to the conditional plan generator 620.

In various implementations, the conditional plan generator 620 generates the conditional plans 540 based on the model 252. In some implementations, the conditional plan generator 620 generates the conditional plans 540 to correspond to respective ones of the candidate point clouds 232 in the model 252. For example, in some implementations, the conditional plan generator 620 generates the first conditional plan 540*a* based on the first candidate point cloud 232*a*, the second conditional plan 540*b* based on the second candidate point cloud 232*b*, the third conditional plan 540*c* based on the third candidate point cloud 232*c*, . . . , and the nth conditional plan 540*n* based on the nth candidate point cloud 232*n*.

In some implementations, generating the conditional plans 540 includes making respective determinations that a portion of the environment of the agent matches corresponding ones of the candidate point clouds 232. For example, in some implementations, generating the first conditional plan 540*a* includes making a first determination that a portion of the environment of the agent matches the first candidate point cloud 232*a*. Similarly, in some implementations, generating the second conditional plan 540*b* includes making a second determination that the portion of the environment of the agent matches the second candidate point cloud 232*b*.

In various implementations, the conditional plan generator 620 provides the conditional plans 540 to the plan selector 630. In some implementations, the conditional plan generator 620 associates the confidence scores 234 with the conditional plans 540. For example, the conditional plan generator 620 associates the first confidence score 234*a* with the first conditional plan 540*a*, the second confidence score 234*b* with the second conditional plan 540*b*, . . . , and the nth confidence score 234*n* with the nth conditional plan 540*n*.

In some implementations, the plan selector 630 selects a subset of the conditional plans 540. In some implementations, the subset includes a particular one of the conditional plans 540. In some implementations, the plan selector 630 initially selects the conditional plan 540 that is associated with the greatest confidence score 234. In the example of FIG. 6A, the plan selector 630 initially selects the first conditional plan 540*a*, for example, because the first conditional plan 540*a* is associated with the first confidence score 234*a* and the first confidence score 234*a* is greater than the remaining confidence scores 234.

As shown in FIG. 6A, the plan selector 630 provides the first conditional plan 540*a* to the plan effectuator 640. More generally, in various implementations, the plan selector 630 provides the plan effectuator 640 an indication that the plan selector 630 has selected a subset (e.g., a particular one) of the conditional plans 540. In various implementations, the plan effectuator 640 generates a first set of one or more actions 642 for the agent in accordance with the first conditional plan 540*a*. In some implementations, the plan effectuator 640 includes a neural network system that accepts the first conditional plan 540*a* as an input, and outputs the first set of one or more actions 642 for the agent. In some implementations, the plan effectuator 640 provides the first set of one or more actions 642 to an animation pipeline that animates the agent in order to provide an appearance that the agent is performing the first set of one or more actions 642. In some implementations, the plan effectuator 640 is referred to as an action generator, for example, because the plan effectuator 640 generates the first set of one or more actions 642.

Figure 6B:
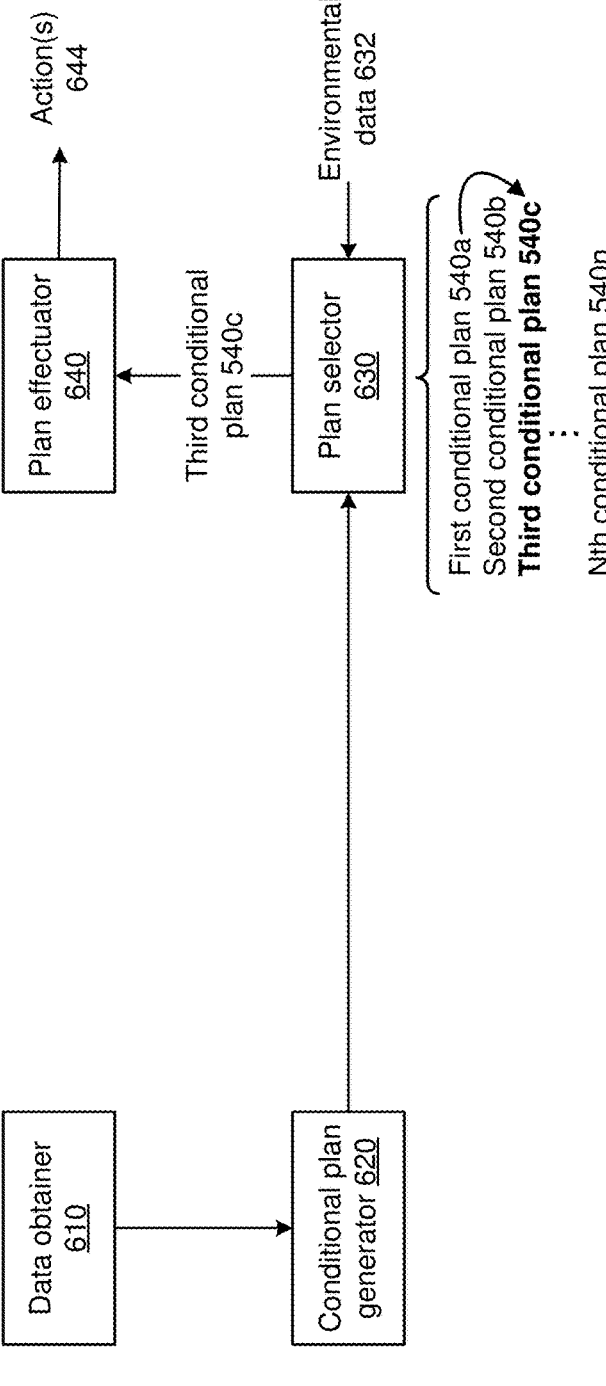

Referring to FIG. 6B, in some implementations, the planner 600 (e.g., the plan selector 630) obtains environmental data 632 after selecting one of the conditional plans 540. In some implementations, the environmental data 632 includes information that was not available when the model 252 was synthesized. For example, in some implementations, the environmental data 632 includes image data and/or depth data that was not available when the model 252 was synthesized. In some implementations, the environmental data 632 includes ray cast information that is collected as the agent moves through the environment while performing the first set of actions 642 shown in FIG. 6A.

As shown in FIG. 6B, in some implementations, the plan selector 630 switches from one of the conditional plans 540 to another one of the conditional plans 540 based on the environmental data 632. In the example of FIG. 6B, the plan selector 630 switches from the first conditional plan 540a to the third conditional plan 540c based on the environmental data 632. As described in relation to FIG. 6A, the conditional plan generator 620 generated the first conditional plan 540a based on a determination that a portion of the environment of the agent matches the first candidate point cloud 232a included in the model 252, and the conditional plan generator 620 generated the third conditional plan 540c based on a determination that the portion of the environment matches the third candidate point cloud 232c included in the model 252. In some implementations, the plan selector 630 switches to the third conditional plan 540c because the environmental data 632 indicates that the portion of the environment more closely matches the third candidate point cloud 232c than the first candidate point cloud 232a.

As can be seen in FIG. 6B, the plan effectuator 640 generates a second set of one or more actions 644 for the agent based on the third conditional plan 540c. In some implementations, the second set of one or more actions 644 is different from the first set of one or more actions 642 (shown in FIG. 6A) that was generated based on the first conditional plan 540a. For example, the first set of one or more actions 642 may have triggered the agent 520 to move along the first path 550 (shown in FIG. 5A) and sit at an end of a straight virtual couch represented by the first candidate virtual couch 140a, whereas the second set of one or more actions 644 may trigger the agent 520 to move along the second path 564 (shown in FIG. 5B) and sit at an edge of an L-shaped virtual couch represented by the second candidate virtual couch 140b.

In some implementations, the second set of one or more actions 644 replaces any remaining actions in the first set of one or more actions 642 shown in FIG. 6A. For example, if the agent has performed a first half of the first set of one or more actions 642, the agent forgoes performing (e.g., abandons) a second half of the first set of one or more actions 642 and starts performing the second set of one or more actions 644.

FIG. 7 is a flowchart representation of a method 700 for generating a set of conditional plans for an agent. In various implementations, the method 700 is performed by a device (e.g., the electronic device 500 and/or the planner 530 shown in FIGS. 5A and 5B, and/or the planner 600 shown in FIGS. 6A and 6B). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in various implementations, the method 700 includes obtaining a model of an environment that includes a point cloud representing a first portion of an object, a plurality of candidate point clouds for a second portion of the object and corresponding confidence scores associated with the plurality of candidate point clouds. For example, as shown in FIG. 5A, the electronic device 500 (e.g., the planner 530) obtains the model 252. In some implementations, the method 700 includes receiving the model. For example, as described in relation to FIG. 6A, in some implementations, the data obtainer 610 receives the model 252 from the modeling system 200 shown in FIGS. 1A-2. In some implementations, the method 700 includes synthesizing the model based on environmental data corresponding to the environment. For example, as described in relation to FIGS. 1A-2, in some implementations, the modeling system 200 synthesizes the model 252 based on the environmental data 24 shown in FIG. 1A.

As represented by block 720, in some implementations, the method 700 includes generating a set of conditional plans for an agent that is associated with an objective. In some implementations, each conditional plan in the set of conditional plans corresponds to a respective candidate point cloud of the plurality of point clouds in the model. For example, as shown in FIG. 6A, the conditional plan generator 620 generates the conditional plans 540 based on the candidate point clouds 232 included in the model 252. As described in relation to FIG. 6A, the first conditional plan 540a is based on a determination that a portion of the environment of the agent matches the first candidate point cloud 232a, the second conditional plan 540b is based on a determination that the portion of the environment matches the second candidate point cloud 232b, . . . , and the nth conditional plan 540n is based on a determination that the portion of the environment matches the nth candidate point cloud 232n.

As represented by block 730, in some implementations, the method 700 includes selecting a first conditional plan from the set of conditional plans based on the corresponding confidence scores associated with the plurality of candidate point clouds. In some implementations, the first conditional plan corresponds to a first candidate point cloud of the plurality of candidate point clouds.

As represented by block 730a, in some implementations, the method 700 includes ranking the set of conditional plans based on the corresponding confidence scores associated with the plurality of candidate point clouds, and selecting the first conditional plan in response to the first conditional plan being ranked higher than a remainder of the set of conditional plans. As an example, referring to FIG. 6A, the plan selector 630 ranks the conditional plans 540 based on their respective confidence scores 234, and selects the first conditional plan 540a in response to the first conditional plan 540a being ranked higher than the other conditional plans 540b, . . . , and 540n.

In some implementations, the method 700 includes selecting the first conditional plan in response to the first candidate point cloud being associated with a first confidence score that is greater than the corresponding confidence scores associated with a remainder of the plurality of candidate point clouds. For example, as described in relation to FIG. 6A, in some implementations, the plan selector 630 initially selects the first conditional plan 540a from the set of conditional plans 540 because the first conditional plan 540a is based on the first candidate point cloud 232a and the first confidence score 234a associated with the first candidate point cloud 232a is greater than the other confidence scores 234b, 234c, . . . , and 234n.

As represented by block 740, in some implementations, the method 700 includes after selecting the first conditional plan, obtaining environmental data corresponding to the environment. For example, as shown in FIG. 6B, the planner 600 (e.g., the plan selector 630) receives the environmental data 632 after selecting the first conditional plan 540a. In some implementations, the method 700 includes receiving the environmental data while the agent is performing a sequence of actions in accordance with the first conditional plan. For example, as described in relation to FIG. 6B, in some implementations, the planner 600 receives the environmental data 632 while the agent is performing the first set of one or more actions 642 shown in FIG. 6A.

As represented by block 740a, in some implementations, the method 700 includes after selecting the first conditional plan and prior to switching to the second conditional plan, generating a first set of actions for the agent based on the first conditional plan, and animating a representation of the agent in order to provide an appearance that the agent is performing the first set of actions. For example, as described in relation to FIG. 6A, after the plan selector 630 selects the first conditional plan 540a, the plan effectuator 640 generates the first set of one or more actions 642 for the agent in accordance with the first conditional plan 540a.

In some implementations, the method 700 includes obtaining the environmental data while the representation of the agent is being animated based on the first set of actions. For example, in some implementations, as the agent moves in the environment, the agent captures an image of the environment from a different POV. In some implementations, the environmental data includes ray cast information that indicates objects that are in a field-of-view of the agent as the agent moves through the environment while performing the first set of actions.

As represented by block 740b, in some implementations, the environmental sensor includes an image sensor, and obtaining the environmental data includes capturing image data via the image sensor. For example, in some implementations, the environmental data 632 shown in FIG. 6B includes a set of one or more images. In some implementations, the environmental sensor includes a depth sensor, and obtaining the environmental data includes capturing depth data via the depth sensor. For example, in some implementations, the environmental data 632 shown in FIG. 6B includes depth data.

As represented by block 750, in some implementations, the method 700 includes switching to a second conditional plan of the set of conditional plans in response to the environmental data indicating that the second portion of the object matches a second candidate point cloud of the plurality of candidate point clouds. For example, as shown in FIG. 5B, the planner 530 switches from the first conditional plan 540a to the third conditional plan 540c in response to the environmental data 560 indicating that the environment of the agent more closely matches the third candidate point cloud 232c.

As represented by block 750a, in some implementations, switching to the second conditional plan includes switching to the second conditional plan after the representation of the agent has been animated in accordance with a subset of the first set of actions, and after switching to the second conditional plan forgoing animating the representation of the agent in accordance with a remainder of the first set of actions. For example, as discussed in relation to FIGS. 5A and 5B, after switching to the third conditional plan 540c the agent 520 moves along the second path 564 shown in FIG. 5B instead of the first path 550 shown in FIG. 5A.

In some implementations, the method 700 includes, after switching to the second conditional plan, generating a second set of actions for the agent based on the second conditional plan, and animating the representation of the agent in order to provide an appearance that the agent is performing the second set of actions. The second set of actions is different from the first set of actions. For example, as shown in FIGS. 6A and 6B, after switching to the third conditional plan 540c, the plan effectuator 640 generates the second set of one or more actions 644 that is different from the first set of one or more actions 642 shown in FIG. 6A.

In some implementations, at least one of the actions in the second set of actions includes undoing an action from the first set of actions. For example, if the agent started walking in a first direction as part of the first set of actions, the second set of actions may include walking in a second direction that is opposite from the first direction.

In some implementations, the method 700 includes, after switching to the second conditional plan, obtaining updated environmental data while performing an action in accordance with the second conditional plan, and switching to a third conditional plan of the set of conditional plans based on the updated environmental data. As an example, referring to FIG. 6B, in some implementations, the planner 600 receives updated environmental data and switches from the third conditional plan 540c to the second conditional plan 540b based on the updated environmental data.

In some implementations, the method 700 includes, after switching to the second conditional plan, obtaining updated environmental data while performing an action in accordance with the second conditional plan, and reverting to the first conditional plan based on the updated environmental data. As an example, referring to FIG. 6B, in some implementations, the planner 600 receives updated environmental data and reverts from the third conditional plan 540c to the first conditional plan 540a based on the updated environmental data.

In some implementations, the first conditional plan triggers the agent to perform a first set of actions and the second conditional plan triggers the agent to perform a second set of actions that is different from the first set of actions. For example, as shown in FIGS. 5A and 5B, the first conditional plan 540a triggers the agent 520 to move along the first path 550 shown in FIG. 5A, and the third conditional plan 540c triggers the agent 520 to move along the second path 564 shown in FIG. 5B.

In some implementations, the first conditional plan triggers a first set of torque values to be applied to virtual joints of a representation of the agent and the second conditional plan triggers a second set of torque values to be applied to the virtual joints of the representation of the agent. As an example, referring to FIGS. 5A and 5B, in some implementations, the electronic device 500 applies a first set of torque values to virtual joints of the agent 520 in order to cause the agent 520 to move along the first path 550 shown in FIG. 5A, and the electronic device 500 applies a second set of torque values to the virtual joints of the agent 520 in order to cause the agent 520 to move along the second path 564 shown in FIG. 5B.

In some implementations, the first conditional plan triggers a representation of the agent to interact with the object via a first type of interaction and the second conditional plan triggers the representation of the agent to interact with the object via a second type of interaction. For example, in some implementations, the first conditional plan triggers the agent to lift the object and the second conditional plan triggers the agent to push the object (e.g., the environmental data indicates that the object is too heavy to be lifted).

Figure 8:
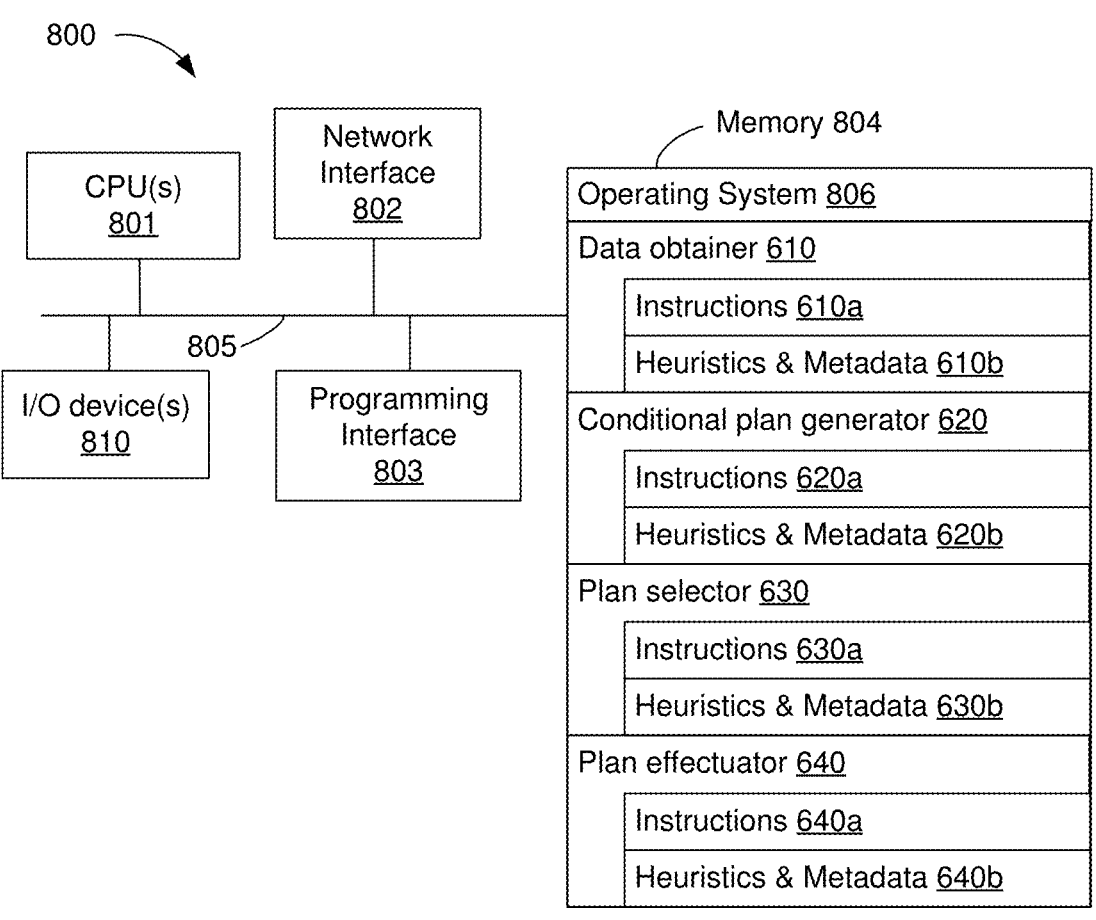
FIG. 8 is a block diagram of a device that generates a set of conditional plans in accordance with some implementations.

FIG. 8 is a block diagram of a device 800 in accordance with some implementations. In some implementations, the device 800 implements the electronic device 500 and/or the planner 530 shown in FIGS. 5A and 5B, and/or the planner 600 shown in FIGS. 6A and 6B. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the data obtainer 610, the conditional plan generator 620, the plan selector 630 and the plan effectuator 640. In various implementations, the device 800 performs the method 700 shown in FIG. 7.

In some implementations, the data obtainer 610 includes instructions 610a, and heuristics and metadata 610b for obtaining a model (e.g., the model 252 shown in FIGS. 2, and 6A) and/or environmental data (e.g., the environmental data 632 shown in FIG. 6B). In some implementations, the data obtainer 610 performs at least some of the operation(s) represented by block 710 in FIG. 7.

In some implementations, the conditional plan generator 620 includes instructions 620a, and heuristics and metadata 620b for generating a set of conditional plans (e.g., the conditional plans 540 shown in FIGS. 5A-6B). In some implementations, the conditional plan generator 620 performs at least some of the operation(s) represented by block 720 in FIG. 7.

In some implementations, the plan selector 630 includes instructions 630a, and heuristics and metadata 630b for selecting a particular one of the conditional plans generated by the conditional plan generator 620. In some implementations, the plan selector 630 performs at least some of the operation(s) represented by blocks 730, 740 and 750 in FIG. 7.

In some implementations, the plan effectuator 640 includes instructions 640a, and heuristics and metadata 640b for effectuating a plan selected by the plan selector 630. In some implementations, the plan effectuator 640 performs at least some of the operation(s) represented by blocks 740 and 750 in FIG. 7.

In some implementations, the one or more I/O devices 810 include an environmental sensor for obtaining environmental data. In some implementations, the environmental sensor includes a depth sensor (e.g., a depth camera) and/or an image sensor (e.g., a camera, for example, a visible light camera or an infrared light camera). In some implementations, the environmental sensor includes a physical sensor for sensing physical environments. In some implementations, the environmental sensor includes a virtual sensor for sensing virtual environments. In some implementations, the one or more I/O devices 810 include a display for displaying a graphical environment.

In various implementations, the one or more I/O devices 810 include a video pass-through display which displays at least a portion of a physical environment surrounding the device 800 as an image captured by a scene camera. In various implementations, the one or more I/O devices 810 include an optical see-through display which is at least partially transparent and passes light emitted by or reflected off the physical environment.

It will be appreciated that FIG. 8 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 8 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including an environmental sensor, a non-transitory memory and one or more processors coupled with the environmental sensor and the non-transitory memory:

obtaining, via the environmental sensor, environmental data corresponding to an environment;

determining that the environmental data corresponds to a first portion of an object that represents a sub-portion of the object and not an entirety of the object;

generating a plurality of candidate point clouds for a second portion of the object based on the environmental data corresponding to the first portion of the object, wherein the environmental data does not correspond to the second portion of the object and wherein the first portion of the object is in a field of detection of the environmental sensor and the second portion of the object is outside the field of detection of the environmental sensor, wherein generating the plurality of candidate point clouds comprises:

providing a portion of the environmental data corresponding to the first portion of the object to a neural network system; and receiving the plurality of candidate point clouds and corresponding confidence scores as outputs of the neural network system; and synthesizing a model of the environment that includes a point cloud representing the first portion of the object and at least a subset of the plurality of candidate point clouds for the second portion of the object.

2. The method of claim 1, wherein generating the plurality of candidate point clouds comprises generating at least one of the plurality of candidate point clouds by extrapolating a geometric feature of the first portion of the object.

3. The method of claim 1, wherein generating the plurality of candidate point clouds comprises generating at least one of the plurality of candidate point clouds based on a proportion of the first portion of the object.

4. The method of claim 1, wherein generating the plurality of candidate point clouds comprises generating at least one of the plurality of candidate point clouds based on an interaction of the object with another object.

5. The method of claim 1, wherein the second portion of the object is occluded.

6. The method of claim 1, wherein the environment is a graphical environment, and wherein obtaining the environmental data comprises receiving image data corresponding to the graphical environment.

7. The method of claim 1, wherein the environmental sensor comprises a depth sensor, and wherein obtaining the environmental data comprises receiving depth data from the depth sensor.

8. The method of claim 1, wherein the environmental sensor comprises an image sensor, and wherein obtaining the environmental data comprises receiving image data from the image sensor.

9. The method of claim 1, wherein the determination that the first portion represents a sub-portion of the object and not the entirety of the object is based on a proportion of the first portion of the object.

10. The method of claim 1, wherein the determination that the first portion represents a sub-portion of the object and not the entirety of the object is based on at least one of: (i) one or more characteristics of the first portion of the object or (ii) a position of another object in the environment.

11. A device comprising:

an environmental sensor;

one or more processors;

a non-transitory memory; and one or more programs stored in the non-transitory memory, which, when executed by the one or more processors, cause the device to:

obtain, via the environmental sensor, environmental data corresponding to an environment;

determine that the environmental data corresponds to a first portion of an object that represents a sub-portion of the object and not an entirety of the object, wherein the determination that the first portion represents a sub-portion of the object and not the entirety of the object is based on at least one of: (i) one or more characteristics of the first portion of the object, (ii) a position of another object in the environment, or (iii) a proportion of the first portion of the object;

generate a plurality of candidate point clouds for a second portion of the object based on the environmental data corresponding to the first portion of the object, wherein the environmental data does not correspond to the second portion of the object and wherein the first portion of the object is in a field of detection of the environmental sensor and the second portion of the object is outside the field of detection of the environmental sensor; and synthesize a model of the environment that includes a point cloud representing the first portion of the object and at least a subset of the plurality of candidate point clouds for the second portion of the object.

12. The device of claim 11, wherein generating the plurality of candidate point clouds comprises generating at least one of the plurality of candidate point clouds based on stored knowledge regarding the environment.

13. The device of claim 11, wherein generating the plurality of candidate point clouds comprises generating at least one of the plurality of candidate point clouds based on a position of the object within the environment.

14. The device of claim 11, wherein generating the plurality of candidate point clouds comprises:

providing a portion of the environmental data corresponding to the first portion of the object to a neural network system; and receiving the plurality of candidate point clouds and corresponding confidence scores as outputs of the neural network system.

15. The device of claim 11, wherein generating the plurality of candidate point clouds comprises generating at least one of the plurality of candidate point clouds based on at least one of: (i) a proportion of the first portion of the object or (ii) an interaction of the object with another object.

16. A non-transitory memory storing one or more programs, which, when executed by one or more processors of a device, cause the device to:

obtain, via an environmental sensor, environmental data corresponding to an environment;

determine that the environmental data corresponds to a first portion of an object that represents a sub-portion of the object and not an entirety of the object;

generate a plurality of candidate point clouds for a second portion of the object based on the environmental data corresponding to the first portion of the object, wherein the environmental data does not correspond to the second portion of the object and wherein the first portion of the object is in a field of detection of the environmental sensor and the second portion of the object is outside the field of detection of the environmental sensor, wherein generating the plurality of candidate point clouds comprises generating at least one of the plurality of candidate point clouds based on at least one of: (i) a proportion of the first portion of the object or (ii) an interaction of the object with another object; and synthesize a model of the environment that includes a point cloud representing the first portion of the object and at least a subset of the plurality of candidate point clouds for the second portion of the object.

17. The non-transitory memory of claim 16, wherein generating the plurality of candidate point clouds comprises generating at least one of the plurality of candidate point clouds by extrapolating a geometric feature of the first portion of the object.

18. The non-transitory memory of claim 16, wherein the determination that the first portion represents a sub-portion of the object and not the entirety of the object is based on a position of another object in the environment.

19. The non-transitory memory of claim 16, wherein the environment is a physical environment, and wherein obtaining the environmental data comprises receiving image data or depth data corresponding to the physical environment.

20. The non-transitory memory of claim 16, wherein generating the plurality of candidate point clouds comprises:

providing a portion of the environmental data corresponding to the first portion of the object to a neural network system; and receiving the plurality of candidate point clouds and corresponding confidence scores as outputs of the neural network system.

\* \* \* \* \*